United States Patent
Lee

(10) Patent No.: US 7,028,096 B1
(45) Date of Patent: Apr. 11, 2006

(54) METHOD AND APPARATUS FOR CACHING FOR STREAMING DATA

(75) Inventor: Horng-Juing Lee, San Jose, CA (US)

(73) Assignee: Streaming21, Inc., San Jose, CA (US)

( * ) Notice: Subject to any disclaimer, the term of this patent is extended or adjusted under 35 U.S.C. 154(b) by 566 days.

(21) Appl. No.: 09/658,705

(22) Filed: Sep. 8, 2000

Related U.S. Application Data

(60) Provisional application No. 60/153,905, filed on Sep. 14, 1999.

(51) Int. Cl.
*G06F 15/16* (2006.01)
*H04N 7/16* (2006.01)

(52) U.S. Cl. .................................... 709/231; 725/145

(58) Field of Classification Search ............... 709/213, 709/231–236; 725/92, 94, 115, 145
See application file for complete search history.

(56) References Cited

U.S. PATENT DOCUMENTS

| | | | |
|---|---|---|---|
| 5,442,390 A | | 8/1995 | Hooper et al. |
| 5,568,181 A | * | 10/1996 | Greenwood et al. .......... 725/92 |
| 5,610,841 A | * | 3/1997 | Tanaka et al. ............... 725/115 |
| 5,761,716 A | | 6/1998 | Byrn et al. |
| 5,787,472 A | * | 7/1998 | Dan et al. .................... 711/134 |
| 5,815,662 A | * | 9/1998 | Ong ............................ 725/92 |
| 5,838,912 A | | 11/1998 | Poon et al. |
| 5,933,603 A | | 8/1999 | Vahalia et al. |
| 6,085,193 A | * | 7/2000 | Malkin et al. ................. 707/10 |
| 6,272,598 B1 | * | 8/2001 | Arlitt et al. ................. 711/133 |
| 6,317,778 B1 | * | 11/2001 | Dias et al. ................... 709/214 |
| 6,377,972 B1 | * | 4/2002 | Guo et al. .................... 709/201 |
| 6,385,699 B1 | * | 5/2002 | Bozman et al. .............. 711/133 |
| 6,425,057 B1 | * | 7/2002 | Cherkasova et al. ......... 711/134 |
| 6,463,508 B1 | * | 10/2002 | Wolf et al. .................. 711/133 |
| 6,502,139 B1 | * | 12/2002 | Birk et al. ................... 709/233 |
| 6,570,579 B1 | * | 5/2003 | MacInnis et al. ............ 345/629 |
| 6,636,222 B1 | * | 10/2003 | Valmiki et al. .............. 345/505 |
| 2002/0049824 A1 | * | 4/2002 | Wilson ........................ 709/213 |

FOREIGN PATENT DOCUMENTS

WO    WO 97/30551    8/1997

OTHER PUBLICATIONS

International Search Report mailed Feb. 6, 2001.

(Continued)

*Primary Examiner*—William C. Vaughn, Jr.
*Assistant Examiner*—J. Bret Dennison
(74) *Attorney, Agent, or Firm*—Parsons Hsue & De Runtz LLP

(57) ABSTRACT

Streaming video data from the video title is delivered to a client from a central server and a proxy server. To reduce the backbone bandwidth required, a portion of the video title is cached at the proxy server where the portion cached is distributed over the video title so as to reduce the peak bit rate required for the central server to send the remaining portion of the video title. The amount cached at the proxy server may be adjusted in accordance with access profile of video titles to improve caching efficiency. The portion cached may be the basic layer in a scalable multilayer approach where only the basic layer may be sent to a client who has limited bandwidth while clients with higher bandwidth capability may also receive the enhancement layer(s) for improved video reception.

66 Claims, 9 Drawing Sheets

OTHER PUBLICATIONS

"Caching Schemes for Distributed Video Services," S.-H. Gary Chan et al., *1999 IEEE International Conference on Consumer Communications*, Jun. 6-10, 1999, vol. 2, pp. 994-999.

"A High Performance Video Server for Karaoke Systems," W-H Tseng et al., *IEEE International Consumer Electronics*, 40(1994) Aug., No. 3, pp. 329-336.

"Partial Video Sequence Caching Scheme for VOD Systems with Heterogeneous Clients," M. Y.M. Chiu et al., *IEEE Transactions on Industrial Electronics*, vol. 45, No. 1, Feb. 1998, pp. 44-51.

"Proxy Prefix Caching for Multimedia Streams," S. Sen et al., *IEEE*, Mar. 21-25, 1999, pp. 1310-1319.

* cited by examiner

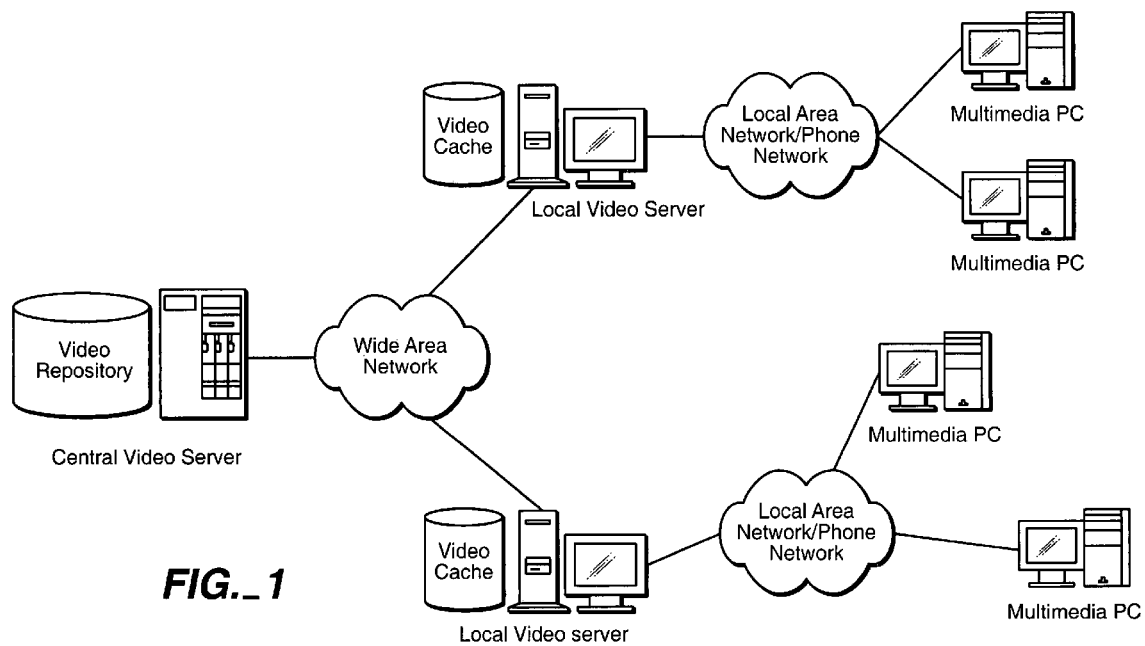
FIG._1

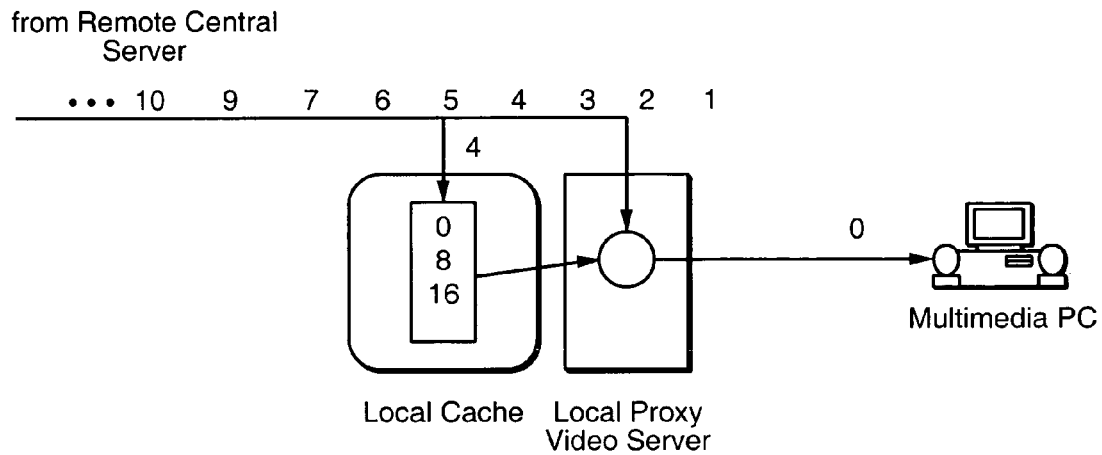
FIG._2
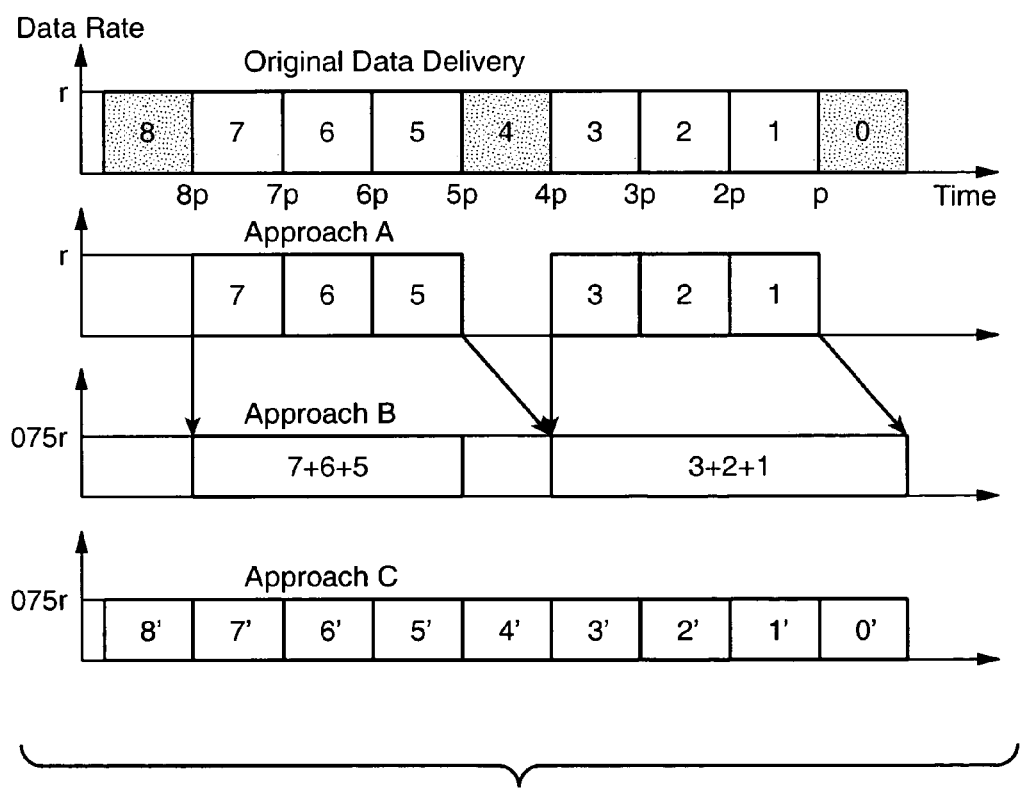
FIG._3A

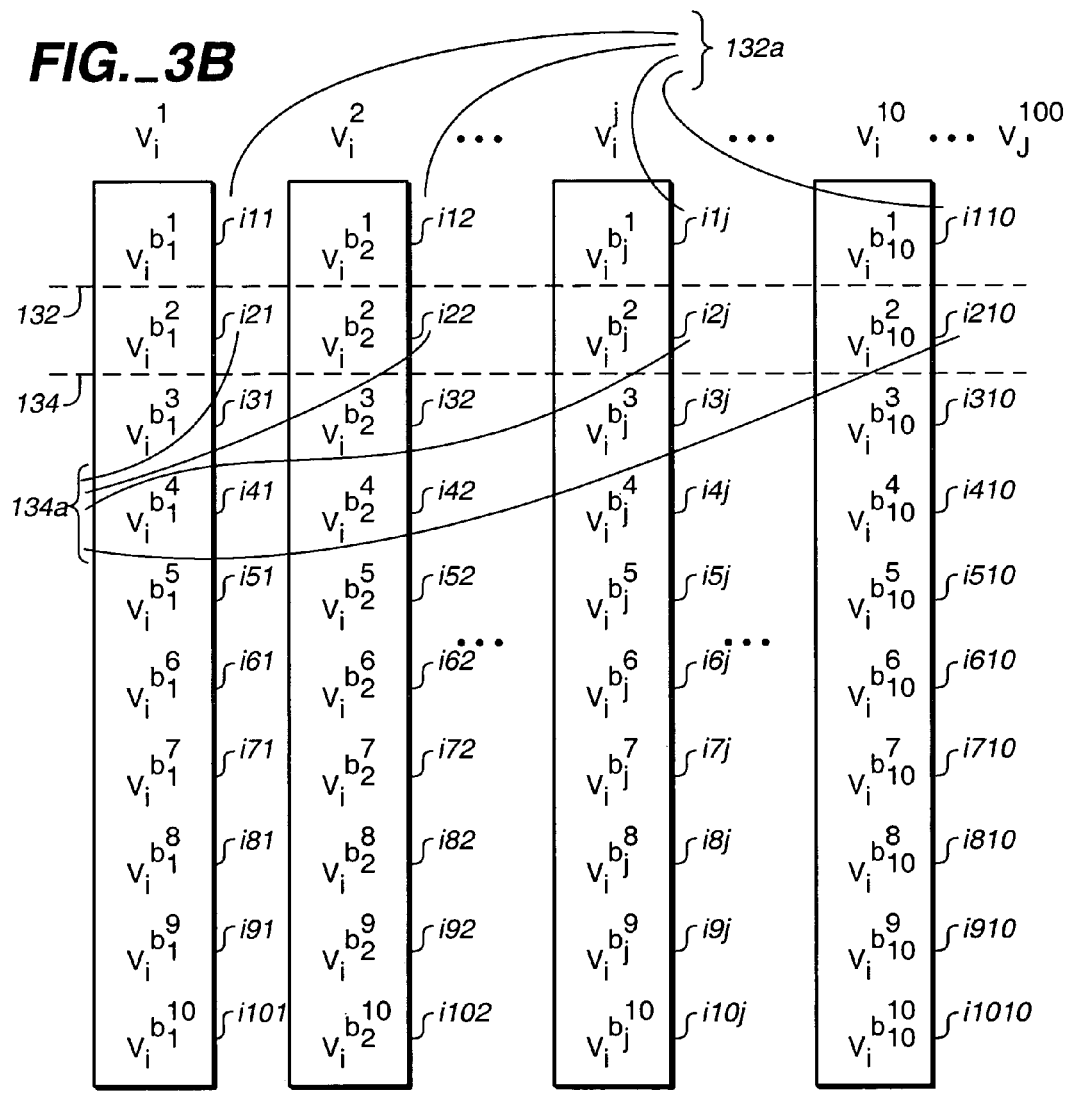
FIG._3B
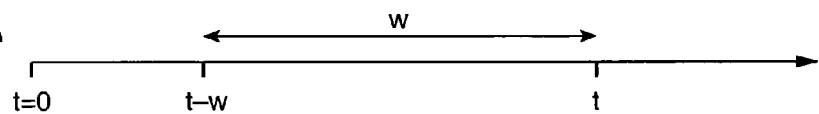
FIG._3C
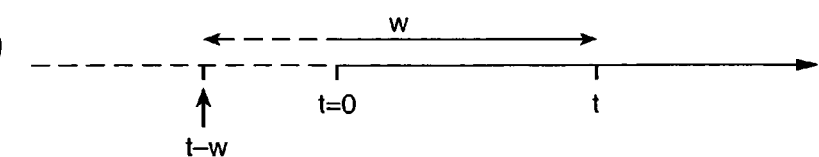
FIG._3D

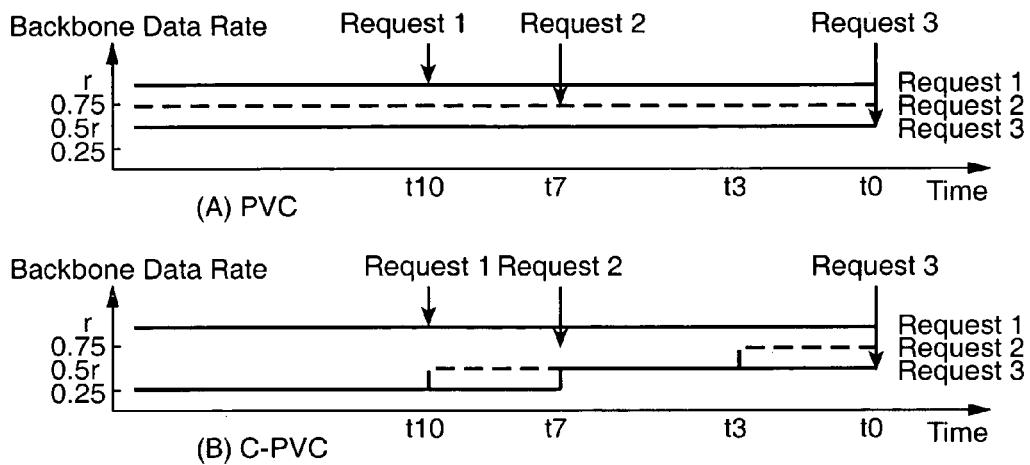
FIG._4
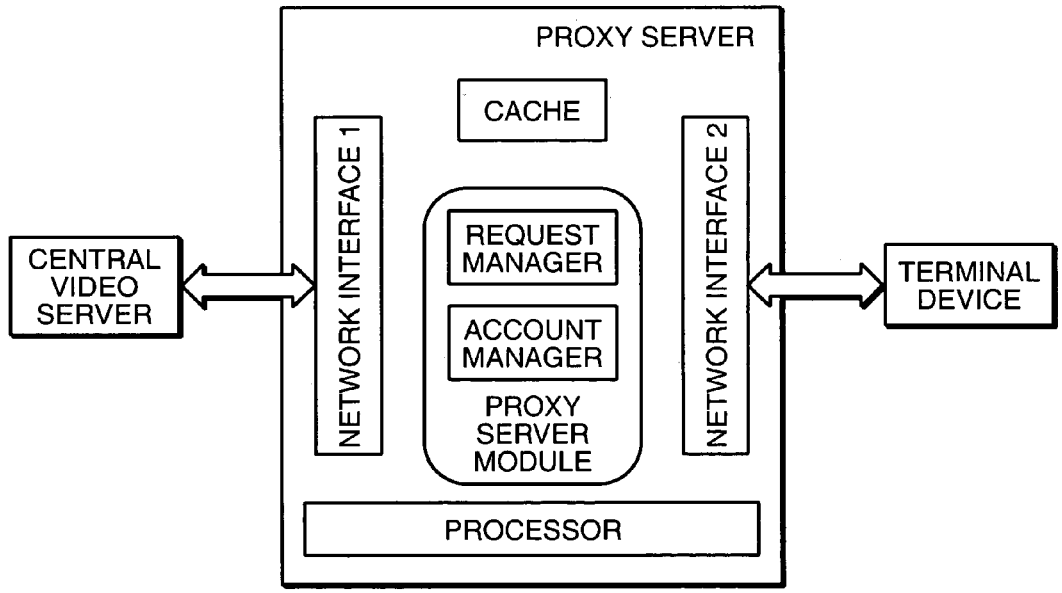
FIG._6

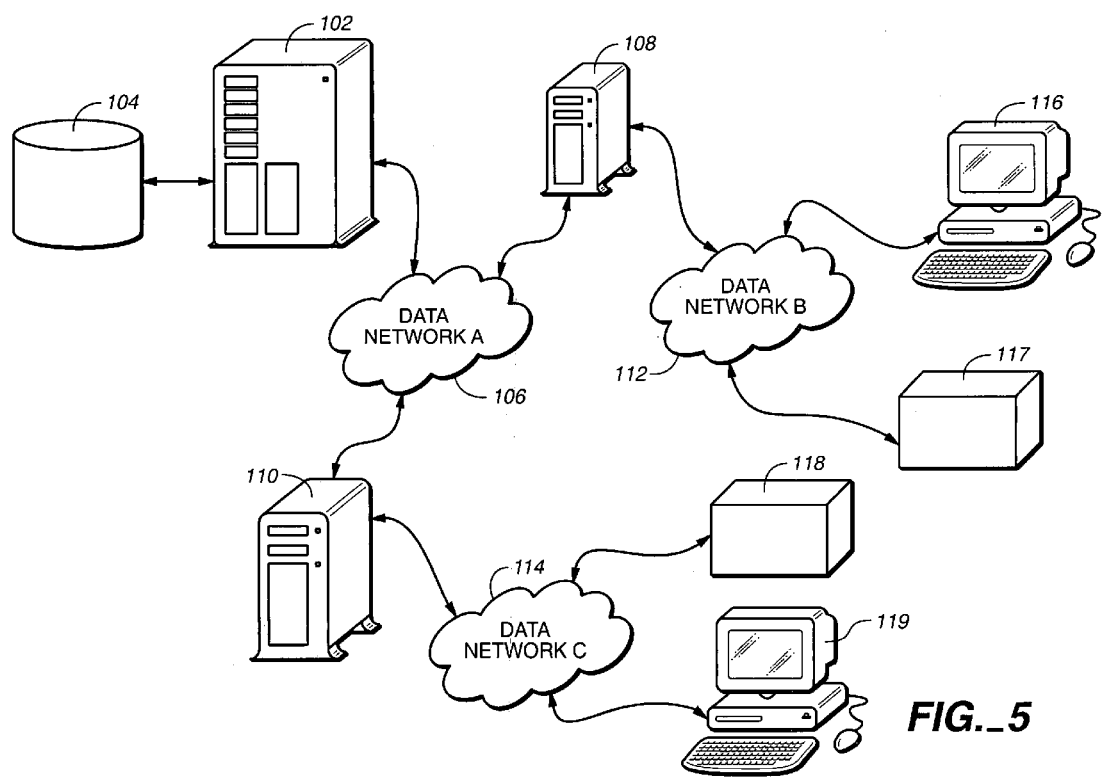
FIG._5

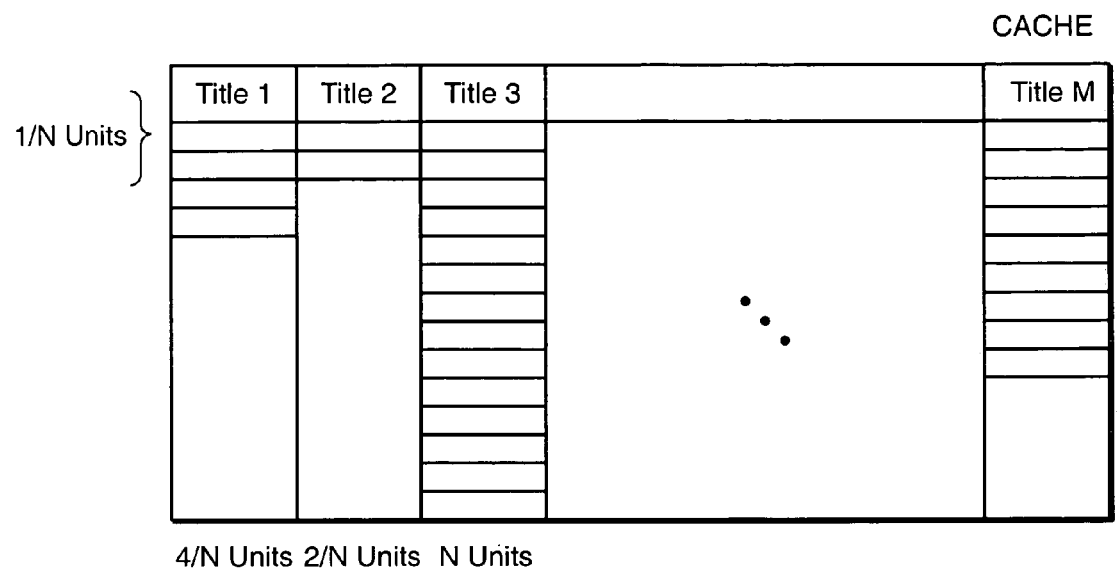
FIG._7
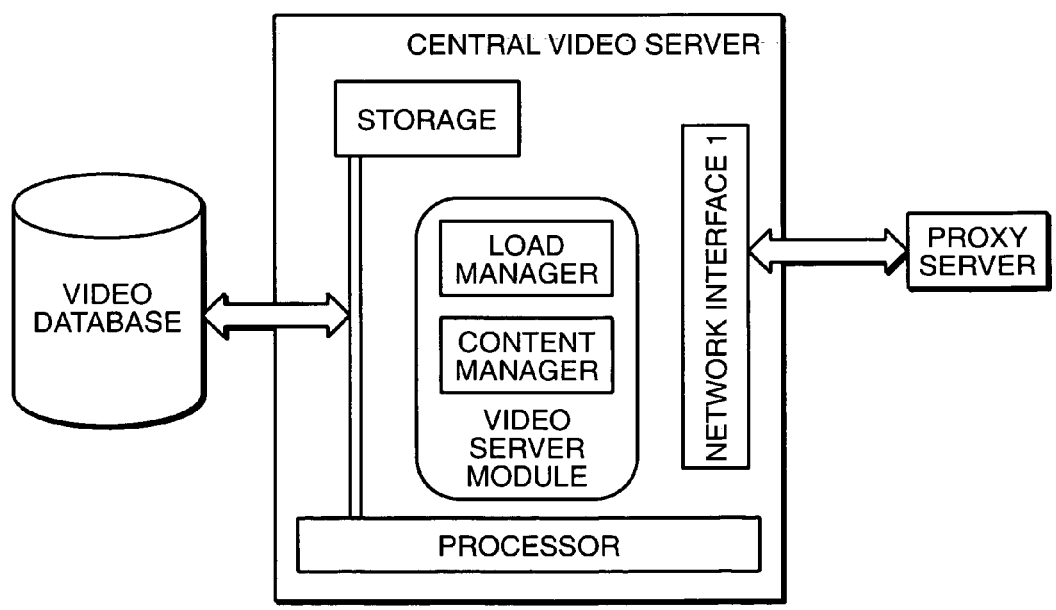
FIG._8

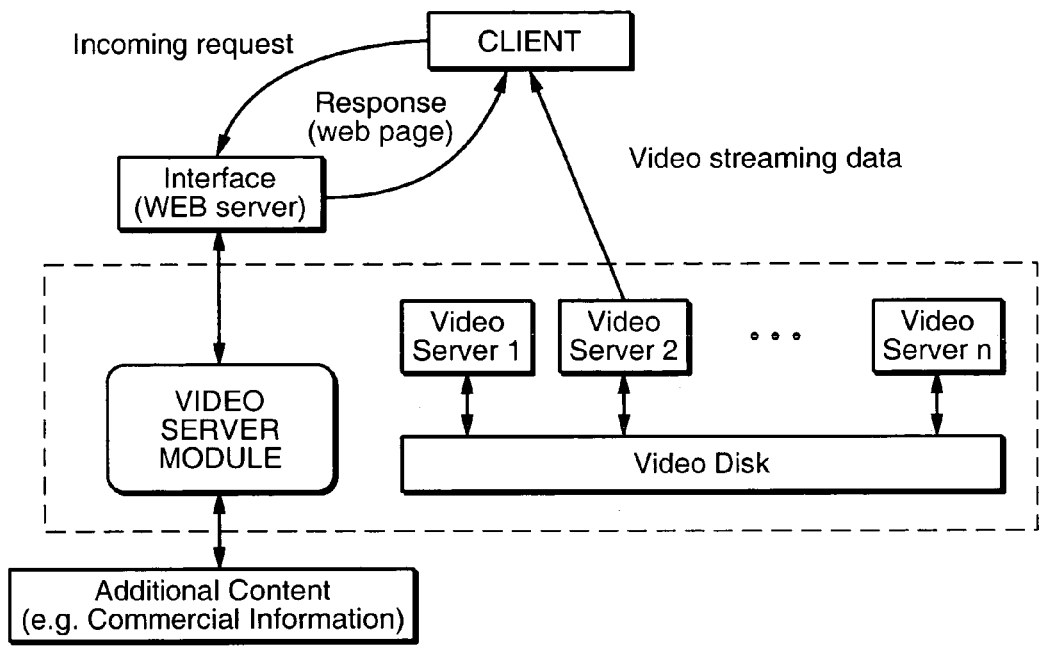
FIG._9
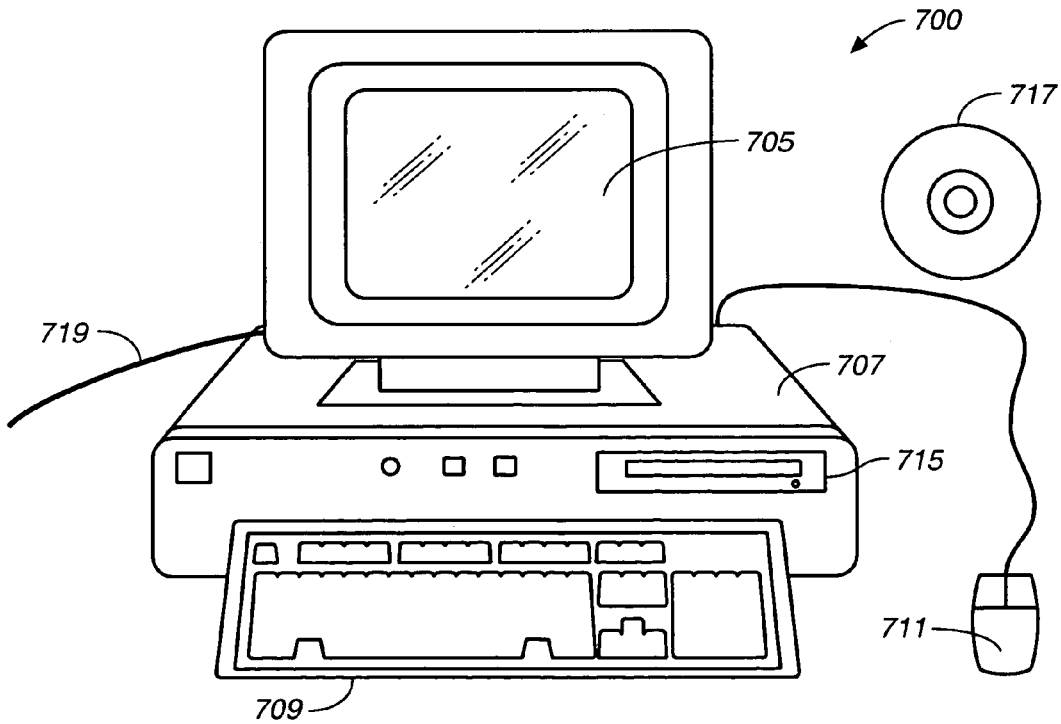
FIG._12

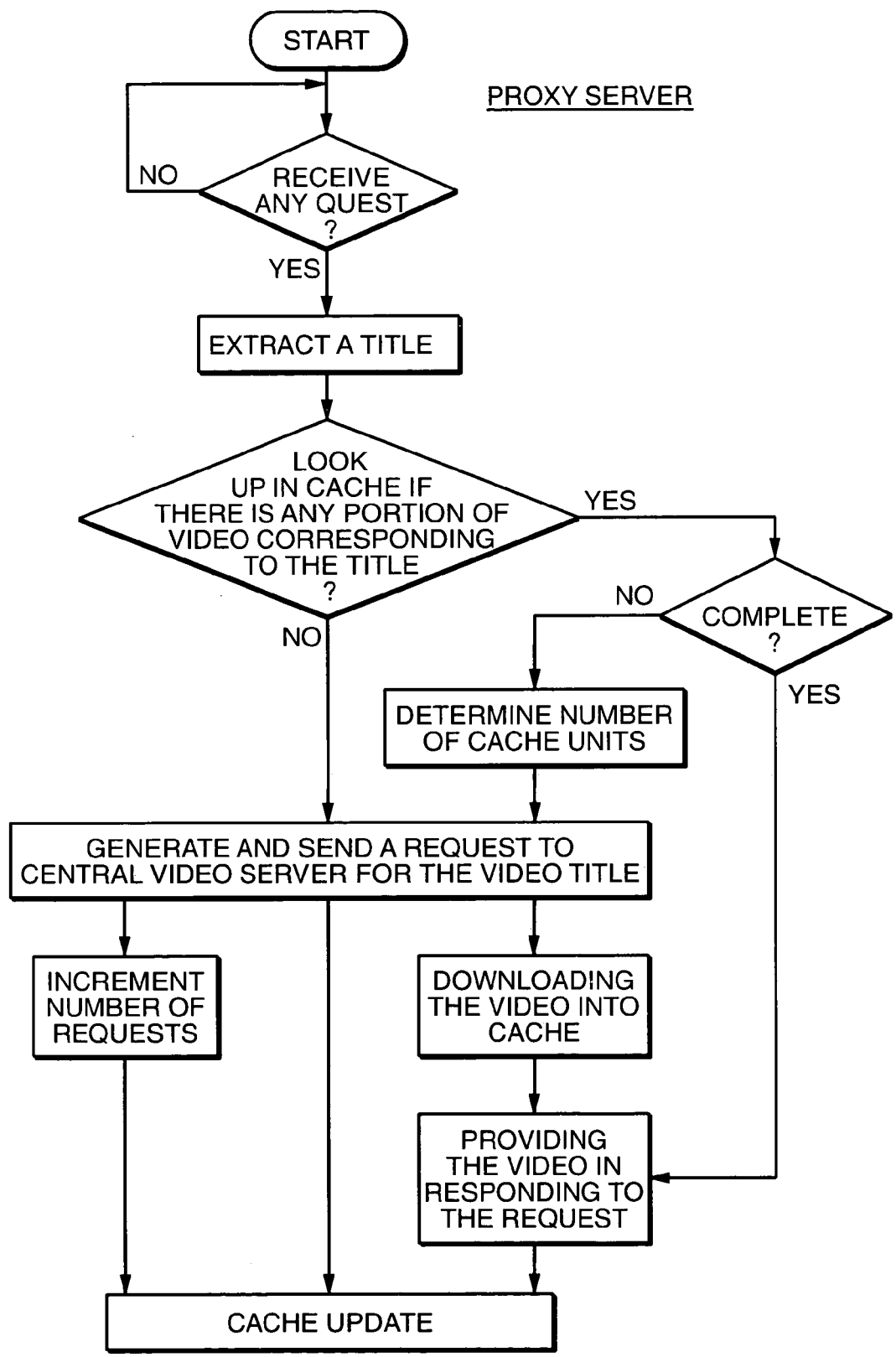
FIG._10

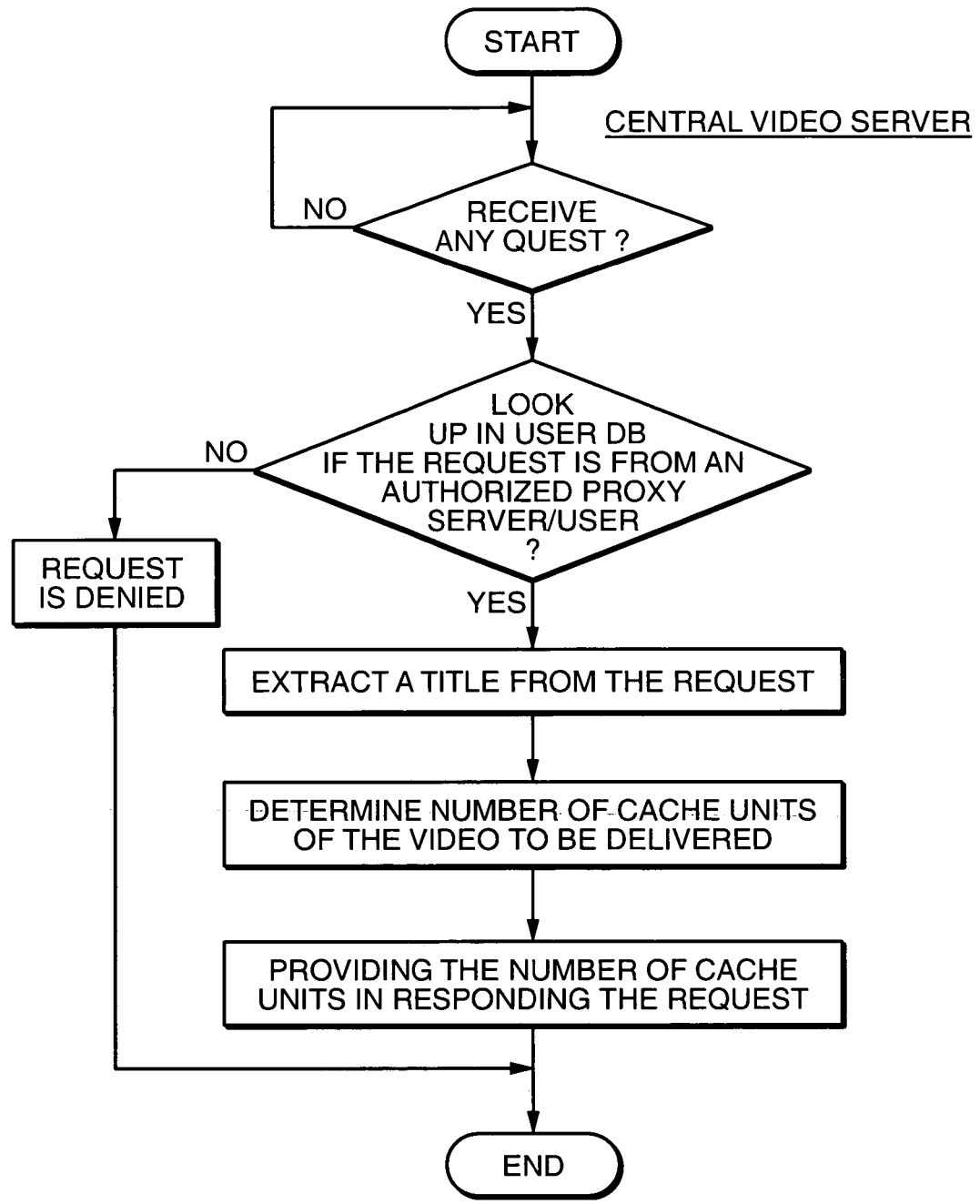
FIG._11

METHOD AND APPARATUS FOR CACHING FOR STREAMING DATA

CROSS REFERENCE TO RELATED APPLICATIONS

This application claims priority from provisional patent application 60/153,905, entitled METHOD AND SYSTEM FOR VIDEO DELIVERY OVER DATA NETWORKS, filed Sep. 14, 1999.

The above referenced application is incorporated herein by reference for all purposes. The prior application, in some parts, may indicate earlier efforts at describing the invention or describing specific embodiments and examples. The present invention is, therefore, best understood as described herein.

FIELD OF THE INVENTION

The invention generally relates to methods and/or devices related to data transmission. More particularly, the invention in various aspects, relates to multimedia data methods and applications and to a system and/or devices and/or methods for improved caching that is particularly applicable to streaming data.

Copyright Notice

A portion of the disclosure of this patent document may contain materials that are subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Prior Publications

The following publications may be related to the invention or provide background information. Listing of these references here should not be taken to indicate that any formal search has been completed or that any of these references constitute prior art.

BACKGROUND OF THE INVENTION

The Internet is a rapidly growing communication network of interconnected computers around the world. Together, these millions of connected computers form a vast repository of hypermedia information that is readily accessible by users through any of the connected computers from anywhere and anytime. As there is an increasing number of users who are connected to the Internet and surf for various information, they meanwhile create tremendous demands for more content to be available and methods to deliver them on the Internet. Currently, the most commonly available information that is deliverable on the Internet may include text information, images and graphics, videos and audio clips.

Continuous information such as continuous videos, audio clips, audiovisual or other multimedia works (referred to below collectively as "media") may be one of the frequently requested network resources. It is therefore not uncommon to experience thousands of access requests simultaneously to a piece of popular video, audio or audiovisual program. Given a network bandwidth of a data network, on-time delivery of the program with the guaranteed quality of service (QoS) over the network becomes critical. It is evidently impractical to rely on a central media server to service all of the access requests at the same time. There is therefore a need for a versatile media delivery system that is capable of responding to thousands of access requests at the same time meanwhile keeping minimum impact on the quality of service.

Due to the technology improvement in the video compression, networking infrastructure, and the overall computer capability, the realization of Video on Demand (VOD) service is becoming feasible. During the recent years, the popularity of Internet World Wide Web accelerates the deployment of VOD service. RealNetwork's Real Media and Microsoft's NetShow Service have successfully delivered low quality audio/video over the Internet. Their services have been adopted many aspects of multimedia applications including (but not limited to) news on demand, distance learning, corporate training, and music distribution. More people than ever are connecting to the Internet and surfing the Web sites to locate the desired information. This triggers more content that is published on the Web.

To attract people to visit their Web sites, companies design Web pages with rich media presentation, especially by adding continuous media features. However, the unique feature of continuous media such as the large storage requirement, high network bandwidth requirement, and time-critical delivery has made the media distribution service over the Internet a nontrivial problem. This is especially true for media works that have high video content. The Video on Demand server is a good fit to this problem but not without challenge ahead. A popular web site potentially may experience thousands of accesses simultaneously. How a video server system is to process all these requests and deliver the video content to end user with the guaranteed quality becomes a pressing issue. One approach addressing the server scalability issue is to build a parallel video server by using the modern clustering technology. However, this approach cannot easily scale up to the magnitude of Web access so that it may be impossible for a central video server to service all end-to-end streaming requests.

Another approach is to add on video delivery service on the existing Internet Web access model. The popularity of Web service has created many new businesses. The Internet Service Providers (ISP) is one of them. They provide the necessary infrastructure, equipment, and service that allow their subscribers easy and fast access to the Internet world. To better serve their customers, an ISP office provides service to customers within a geographic area. All ISP offices are connected via high capacity and expensive backbone networks. All ISP offices work together as a unit. A subscriber's local ISP site is responsible for receiving the user access request, routing the request to the original Web site if necessary, acting as an agent by receiving the reply from the site, and forwarding the requested information back to the requestor. The steps of routing request to the original Web site and receiving the reply from it generate backbone traffic. When more requests travel through the backbone networks, higher backbone bandwidth is required. This means the higher operating cost for the ISP.

To address this problem, the Internet community has developed a Web caching strategy. A web proxy server is installed on a ISP site and serves as a caching engine to store the frequently accessed Web page relating to its subscriber area. Next time when the cached page is referenced, the proxy server delivers the page from its local cache directly instead of from the original Web server. This approach reduces the client's browsing response time (since the content is from local proxy server) and also reduces the backbone demands for content delivery, thus reducing operating cost.

The above web-caching model can also apply to large-scale end-to-end video delivery service.

Many Web proxy server products have been developed, with caching components principally directed to the HTML page and its embedded images. Most prior web proxies generally are not directed to video proxies. Other earlier research addresses QoS (Quality of Service) issues regarding end-to-end video delivery, but again not directed to video proxies. Some techniques have proposed a video staggering scheme to reduce the backbone bandwidth requirement on a distributed multimedia delivery. In these systems, when a particular video clip is requested by the user, a portion of the video content is streamed from central video server via WAN connection and a portion of the video content is streamed from the local proxy server. Both data streams enter a user's playback station. If a large portion of data is streamed from the local server, then less data is streaming from the backbone channel, which results in less backbone bandwidth requirement. Thus, a previous video staging technique is to prefetch a predetermined amount of video data and store them a priori at a proxy server. The proxy server stores the predetermined video content based on the access pattern generated in previous profile cycle, not current access behavior. Some earlier schemes can improve backbone utilization only for content encoded as VBR (variable bit rate) format. For CBR (constant bit rate) encoded video content, some prior approaches do not reduce any WAN bandwidth requirement.

Another approach caches a sliding window worth of data for each video being displayed so that a video can be partially stored at the proxy server. Thus, if a movie request by a client arrives at a proxy server, the proxy server would store a sliding window of W minutes of the movie in its local cache while the movie is being streamed and delivered to the client. If a new request arrives within the time window, the data in the local cache may be utilized so as to reduce the amount of data that has to be sent from the central server and thereby reducing the backbone bandwidth requirement. In one such sliding window approach described by Chan et al. in "Caching Schemes for Distributed Video Services," 1999 *IEEE International Conference on Communications (Vancouver Canada)*, June 1999, the window size is extended upon receipt of a new request for the same movie from that point on to a further of W minutes. While the sliding window scheme may reduce the backbone bandwidth requirement, such reduction is generally unpredictable and depends upon whether further requests for the same movie arrive within the window or not and how frequently such window is extended as described by Chan in the above-referenced article. Thus, if the further requests arrive outside of the sliding window, there will be no reduction in the backbone bandwidth.

Thus, none of the above approaches is entirely satisfactory. It is, therefore, desirable to provide an improved caching scheme whereby the above described difficulties are alleviated.

SUMMARY OF THE INVENTION

This invention is based on the observation that, by storing or caching data from a requested media title where the cached data is distributed over the title, the above-described difficulties can be overcome. When the title that is partially cached by the proxy server is requested by client, only the portion of the title that is not cached by the proxy will need to be obtained from the central server over the backbone. Since the data from the title that is cached by the proxy is distributed over the title, one can achieve reduction of the peak backbone bandwidth from the central server required for transmitting the portion of the title. This is very different from the sliding window approach where the data stored is concentrated in the window, and no data outside the window is cached. The instructions for the method described above and below may be downloaded from a data source or from a computer readable medium. For example, by downloading instructions for the method from a data source, such as directly or through the internet or any other type of computer network, or from an optical or magnetic storage medium, the instructions or program so obtained would enable a client device to carry out the methods described above and below. Thus, the computer readable medium storing such instructions and the process of sending such instructions (or causing them to be sent) through a computer link are within the scope of the invention.

In the preferred embodiment, the media title is divided into blocks and each block is further divided into sub-blocks, where the blocks are transmitted sequentially to the client. In such embodiment, the proxy server caches sub-blocks that are distributed over the blocks. In this manner, the peak transmission bit rate of the central server for transmitting the title is reduced. A number of different embodiments are possible. Thus, the sub-blocks cached can be distributed randomly over the title, such as where the sub-blocks are selected from the sequence of blocks by the use of a random number generator. In another embodiment, the same number of sub-blocks from each block of the title are cached by the proxy server. Or, one can store a sub-block about every n blocks along the time sequence of the blocks, n being a positive integer. In all such embodiments, one can insure reduction of the peak transmission bit rate of the central server. Different from the sliding window scheme described above, the cached sub-blocks are also preferably stored for time periods that are independent of passage of time.

According to another aspect of the invention, progressive media caching may be employed for delivering media selections to one or more media clients over a data network. The data network may be the Internet, the Intranet or a network of private networks. Generally a media title is considered as a set of unequal or equal-sized cache units. When the access frequency to a particular media title is increasing, a proxy server coupled to a central server starts to progressively store more of its cache units since its access behavior justifies its popularity. Similarly, when the access frequency to the media title decreases, the proxy server preferably removes its cache units if no space is otherwise available and makes room for caching other frequently accessed video titles. The arrangement between the access frequency to a video title and its corresponding caching size increases the caching performance of the proxy server so as to reduce the bandwidth requirement on the data link between the proxy server and the central server. The data link typically operates on a network backbone and hence the overall operating cost for the media service provider can be substantially reduced.

BRIEF DESCRIPTION OF THE DRAWINGS

FIG. 1 illustrates an exemplary configuration of a video delivery system including central and local video servers.

FIG. 2 illustrates an exemplary video delivery system according to specific embodiments of the present invention.

FIG. 3A illustrates as an example three possible caching approaches where one quarter of the video data in the video stream is cached at the proxy server in one embodiment.

FIG. 3B is a schematic view of the caching of sub-blocks from the ith video title $v_i$ containing 100 blocks with each block divided into 10 sub-blocks to illustrate a preferred embodiment of the invention.

FIG. 3C is a schematic view of an access profile in a time window W.

FIG. 3D is a schematic view of an access profile in a time window W where the beginning time of the window is before the beginning of time or time=0.

FIG. 4 illustrates as an example a compounded caching effect where increasing portions of the video data in the video stream are cached at the proxy server in response to requests for the video title according to specific embodiments of the present invention.

FIG. 5 illustrates an exemplary configuration of a communication system in which the present invention may be practiced.

FIG. 6 illustrates an exemplary block diagram of a proxy server shown with a central server and a terminal device.

FIG. 7 illustrates an exemplary layout of a cache memory at the proxy server.

FIG. 8 illustrates an exemplary block diagram of a central video server corresponding to the video server in FIG. 6.

FIG. 9 illustrates an exemplary embodiment of a central video server according to an alternate embodiment of the present invention.

FIG. 10 illustrates an exemplary process flowchart of the proxy module according to specific embodiments of the present invention.

FIG. 11 illustrates an exemplary process flowchart of the video server module according to specific embodiments of the present invention.

FIG. 12 is a block diagram showing a representative example logic device in which aspects of the present invention may be embodied The invention and various specific aspects and embodiments will be better understood with reference to the drawings and detailed descriptions. In the different FIGs, similarly numbered items are intended to represent similar functions within the scope of the teachings provided herein.

DESCRIPTION OF THE PREFERRED EMBODIMENTS

Although the media delivery system described below is based on video streaming signals, those skilled in the art can appreciate that the description can be equally applied to audio streaming signals or other media or multimedia signals as well. The detailed description of the present invention here provides numerous specific details in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention. Before the specifics of the embodiments are described, a few more embodiments are outlined generally below.

The present invention involves in part a new cache scheme referred to herein as *Progressive video Cache* (PVC). According to specific embodiments of the invention, a video (or other streaming data) title is handled as a set of equal sized (or varying size in other embodiments) cache units. When the access frequency to a particular video title is increasing, the proxy server then progressively stores more of its cache units since its access behavior justifies its popularity. Similarly, when the video title's access frequency decreases, the proxy server can remove its cache units and make room for caching the hot video titles. The tight couple between a video title's access frequency and its caching size increases the proxy server's caching performance and results in the reduction of backbone bandwidth requirement and overall operating cost.

According to further specifics of the embodiments, once the caching policy is setup, the decision to add or reduce cache units is automatic, thus reducing management headaches. As noted above, the cache units that are stored are distributed in the video title. An enhanced PVC scheme according to further embodiments (referred to herein as Compounded-PVC) envisions that, when a proxy server is serving a request for a title, the scheme further reduces the backbone bandwidth by caching extra cache units in response to subsequent multiple accesses to the same video title. The proxy server is then able to retrieve the stored extra cache units for the subsequent accesses, thereby reducing the amount of data required from the central server and the backbone bandwidth required for sending data from the central server. The later requests benefit from the fact that, in addition to the cache units that are stored under the normal PVC scheme, extra cache units may now be obtained quickly and directly from the proxy in the Compounded-PVC.

Furthermore, it is well known in the art that logic or digital systems and/or methods can include a wide variety of different components and different functions in a modular fashion. The following will be apparent to those of skill in the art from the teachings provided herein. Different embodiments of the present invention can include different combinations of elements and/or functions. Different embodiments of the present invention can include actions or steps performed in a different order than described in any specific example herein. Different embodiments of the present invention can include groupings of parts or components into larger parts or components different than described in any specific example herein. For purposes of clarity, the invention is described in terms of systems that include many different innovative components and innovative combinations of innovative components and known components. No inference should be taken to limit the invention to combinations containing all of the innovative components listed in any illustrative embodiment in this specification. The functional aspects of the invention, as will be understood from the teachings herein, may be implemented or accomplished using any appropriate implementation environment or programming language, such as C++, Cobol, Pascal, Java, Java-script, etc. All publications, patents, and patent applications cited herein are hereby incorporated by reference in their entirety for all purposes.

The invention therefore in specific aspects provides a streaming video/audio signals that can be played on various types of video-capable terminal devices operating under any types of operating systems regardless of what type of players are preinstalled in the terminal devices.

In specific embodiments, the present invention involves caching methods and systems suitable for providing multimedia streaming over a communication data network including a cable network, a local area network, a network of other private networks and the Internet.

The present invention is presented largely in terms of procedures, steps, logic blocks, processing, and other symbolic representations that resemble data processing devices. These process descriptions and representations are the means used by those experienced or skilled in the art to most effectively convey the substance of their work to others skilled in the art. The method along with the system to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the device's registers and memories into analog output signals via resident transducers.

FIG. 1 illustrates an exemplary configuration of a video delivery system including central and local video servers. The model is applicable to both the Internet (and Internet2) and Intranet environment. In this model, a local service site installs one proxy video server and serves the video delivery service to its nearby end users. The local video servers are connected to a central video server via Wide Area Networks. The central video server is a video repository having all copies of video titles. A proxy video server caches frequently accessed video content locally and only gets the video title from the central video server when it has no local copy available. The caching principle is the same for both Web access service and video delivery service. However, the video content imposes an even more challenge when considering its inherent nature of large storage requirement, high network bandwidth requirement, and time sensitive data delivery. The use of higher video quality standards such as those by the Moving Picture Experts Group (MPEG-1, MPEG-2 formats) makes this challenge tougher. An improper caching decision causes wasting of precious resource such as backbone bandwidth and storage space. How to design a good video proxy scheme to address the above issues is addressed according to specific embodiments of the invention as described herein.

Communication System Overview

FIG. 5 illustrates an exemplary computer communication configuration in which the present invention may be practiced. Central server 102 together with a video/audio database 104 from a video/audio source comprising video/audio files that can be accessed on demand. As used herein, video/audio files or titles refer to any video footage, video films and/or video/audio clips that can be compressed or packed in any format. One of the exemplary formats is MPEG. To play MPEG video files, one needs an MPEG viewer or client software executing in a personal computer with sufficient processor speed and internal memory. Another one of the popular formats for audio is MPEG-1 Audio Layer-3 (MP3), a standard technology and format for compressing a sound sequence into a very small file (about one-twelfth the size of the original file) while preserving the original level of sound quality when it is played through a client program (player) downloadable from many web sites.

It should be noted, however, that the exact format of the video files do not affect the operations of the present invention. As will be noted and appreciated, the present invention applies to any formats of the video or audio files as well as other multimedia data that may include, but not be limited to, binary data and files, hypertext files and scripts.

Preferably data network 106 is a data network backbone, namely a larger transmission line. At the local level, a backbone is a line or set of lines that local area networks connect to for a wide area network connection or within a local area network to span distances efficiently (for example, between buildings). On the Internet or other wide area network, a backbone is a set of paths that local or regional networks connect to for long-distance interconnection. Coupled to data network A 106, there are two representative proxy servers 108 and 110 that each service representative terminal devices 116–119 via data network 112 and 114 respectively.

Data network 112 and 114 are typically the Internet, a local area network or phone/cable network through which terminal devices can receive video files. The terminal devices may include, but not be limited to, multimedia computers (e.g. 116 and 119), networked television sets or other video/audio players (e.g. 117 and 118). Typically the terminal devices are equipped with applications or capabilities to execute and display received video files. For example, one of the popular applications is an MPEG player provided in WINDOWS 98 from Microsoft. When an MPEG video file is streamed from one of the proxy servers to the terminal device, by executing the MPEG player in a multimedia computer, the video file can be displayed on a display screen of the computer.

To receive a desired video, one of the terminal devices sends in a request that may comprise the title of the desired video. Additionally the request may include a subscriber identification if the video services allow only authorized access. Upon receiving the request, the proxy server will first check in its cache if the selected video is provided therein, meanwhile the request is recorded by a request manager (see FIG. 6). The selected video will be provided as a streaming video to the terminal device if the entire video is in the cache. Otherwise the proxy server proceeds to send a request to video central server 102 for the rest of the video if there are some units of the video in its cache memory, or for the entire video if there is no units of the video in its cache memory.

General Strategy for Video Caching

For purposes of discussion, in one embodiment, end-to-end video delivery can be understood with reference to the architecture described in FIG. 1. As an example, an end user uses its multimedia personal computer ("PC", or any other suitable terminal device) to issue a video playback request. The request is routed to the local proxy video server first. If the proxy server has the whole content of the requested video, it can serve the request immediately without forwarding the request to the remote central video server. This is called a cache hit and indicates no need of consuming the backbone resource. On the other hand, if the local proxy server does NOT have the video copy at all, it redirects the request to the remote video server and the video data will be streamed out from the central server back to the local proxy server and then to the original requester; this is called a cache miss. In this case, the video data flow over the backbone connection. A caching strategy goal is to improve the cache hit ratio (which includes a cache hit of a partially available video at local proxy server), which then reduces the cache miss ratio and saves the backbone resource. However, storing the entire video copy at the proxy server requires local storage. Therefore, if many video titles need to be stored, a large mass memory must then be installed at the local proxy server and can be expensive. Thus, according to the invention, if portions of the popular video titles are stored at the proxy server, the cached portion may then be combined with the missing portion of the video title from the central server and the combined video title is then streamed to the requester. Therefore, according to one aspect of the invention, for caching a video title, portions of the title that are distributed in the video title are cached. Since such portions are distributed in the video title, less video data would need to be retrieved from the central server and combined with the cached portion for delivery to the requester without interruption. Preferably, the portions of the video data that are stored are evenly distributed throughout the title, so that one can be sure that the peak bit rate required for delivering the missing portions from the central server would be reduced, as explained in more detail below.

Caching efficiency is determined by two factors: minimization of backbone usage and of the amount of local storage at the proxy servers. Thus, if the video titles that are cached at the proxy servers are not those frequently requested by users, this means that the local storage is taken up by less popular titles while the popular titles would need to be fetched from the central server, thereby reducing caching efficiency. Hence, one important factor affecting caching efficiency is the user access profile. Knowing the user access patterns can certainly help to design a better caching strategy. Hence, how to accurately predict user access behavior becomes an important issue in improving the local hit ratio. Previous studies have shown the user access profile followed a Zipf-like distribution. This distribution, however, can only be used as a general guideline and it may not applicable to other cases. For instance, on the same day, different groups of audiences may watch different broadcasting programs at different time periods. It may have several types of access profile at one single day. In addition, the access profile usually represents the past behavior and assuming the near future will follow the trend. The longer the profile update period, the less accuracy of the access profile. It may not be possible to forecast the access profile and be prepared the video titles cached on the local server in advance.

Accordingly, the present invention in particular embodiments does not attempt to predict a access profile, but instead adjusts a caching policy whenever the access behavior changes. Thus, the invention makes sure at any moment of time, a caching policy can ride along with the current access pattern and adjust caching parameters to improve the cache hit ratio. Because the access behavior can change at any time and by different magnitudes, the adjustment of a caching strategy according to a specific embodiment of the invention is completely automatic without any human intervention. This is a big advantage for system administrators.

Proxy Video Server Caching Models

In a Progressive Video Caching (PVC) strategy according to specific embodiments of the invention, a video title is handled as a set of equal sized (or, as discussed below, variable sized) cache units. When the access frequency to a particular video title is increasing, the proxy server then progressively stores more of its cache units because its access behavior justifies its popularity. Similarly, when the video title's access frequency decreases, the proxy server can remove its cache units and make room for caching the hot (most accessed) video titles. The tight couple between a video title's access frequency and its caching size increases the proxy server's caching performance. It results in the reduction of backbone bandwidth requirement and overall operating cost. Another advantage is that once the caching policy is setup, the decision to add or reduce can be made automatic, as further described herein.

Although, for ease of description, a PVC scheme is described herein with a video title partitioned into a set of equal sized cache units, this constraint can be relaxed. The PVC scheme can also partition a video title into a set of varied sized cache units, such as I, B and P frames in the MPEG formats, or in other embodiments described below. In such other scenarios, the PVC scheme is very suitable for video encoded as multilayered format and/or variable bit rate format, as explained below.

In a video delivery model according to a further aspect of the invention, a local proxy server is the one pushing the video data to the user site. The data may be solely from the local proxy (for a cache hit of a wholly available video), solely from the remote server (for a cache miss at the local proxy), or from both the local and remote sites (for a cache hit of a partially available video at local proxy server). FIG. 2 illustrates a video delivery for the scenario of a cache hit of partially available video content. In the FIG., the local proxy transmits the video content to client's multimedia PC. The local proxy server retrieves the data segments 0, 8, 16 locally and the other parts of data segments (e.g., data segment 1, 2, 3, 4, 5, 6, 7, 9, 10, etc.) come from the remote central server. This example is for illustration purposes; the discussion below provides further details of additional embodiments and variations according to the invention.

The example in FIG. 2 also reveals resource requirement of the proxy video server. The proxy server reads/writes the cache data from/into the disk drives (or other types of mass memory). Hence, the speed of the disk drives and its storage capacity affects the caching performance. The proxy server also needs main memory space to buffer the video data. Similarly, the network bandwidth at backbone connection and user connection decide how much video data can flow through it. The following sections discuss the impact of the aforementioned resource to the caching performance and further aspects according to further specific embodiments of the invention.

Video Retrieval Model

Before defining Progressive Video Caching (PVC), the video retrieval model is considered. The video retrieval is viewed as a periodic retrieval process. In each period of length p, the system retrieves $p \times r_i$ of data amount for a client requesting a video title $v_i$ at data rate $r_i$. This is to ensure that the data is ready before the time it is needed at the player. According to the present invention, a video title $v_i$ is treated as a series of video blocks: $v_i^0, v_i^1, \ldots v_i^{ni-1}$, where $n_i \times p$ denotes the video duration and each data block has the size of $p \times r_i$. For the purpose of understanding the present discussion, consider a two buffer scheme in which one buffer stores data being delivered to the user by the networking module and in the meantime the other buffer is used to store the next data block from either the local disk drive or from the remote central server. The example of PVC definition according to the present invention below is based on the above assumption.

General Description of Progressive Video Caching PVC

Progressive Video Caching (PVC) according to the invention is a caching scheme for deciding the amount of video content and the portion of video data to be cached (or replaced). Each time a data caching or a replacement is required, the proxy server follows a PVC scheme according to the invention to identify the portion of a video data to fulfill the caching action or operation.

The PVC defines a parameter called N to specify caching or replacement units. Whenever the proxy server demands a caching (or a replacement of cached material) to a video title, 1/N (where N≧1) portion of the video content is stored (or replaced) locally. In other words, with N equal 2, a proxy server stores or replaces half of a video title in each caching operation. In the special case of N equals 1, the caching unit is a whole video title. The N value, in addition to being used to determine the caching size, defines the exact portion of cached (replaced) video data. The PVC scheme according to specific embodiments of the invention preferably directs that the 1/N portion of data be evenly located in the video title.

While it is preferable for the 1/N portion of data be evenly located in the video title for practical reasons, this is not required. Thus, the sub-blocks cached can be distributed randomly over the title, such as where the sub-blocks are selected from the sequence of blocks by the use of a random number generator. In another embodiment described below, the same number of sub-blocks from each block of the title are cached by the proxy server. Or, one can store a sub-block about every n blocks along the time sequence of the blocks, n being a positive integer. In all such embodiments, one can insure reduction of the peak transmission bit rate of the central server.

According to further embodiments of the invention, "evenly located" can be further understood by considering FIG. 3A which illustrates three possible explanations. The top part of FIG. 3A shows an original delivery schedule for a video title which is delivered at data rate r. During each time period (i.e., p), the proxy server must deliver r×p amount of data to maintain quality of service. For a proxy server operating at the PVC with N=4, a cache operation to the video places ¼ portion of data into a local proxy.

Approach A as illustrated in FIG. 3A implements the data "even" requirement by marking data blocks in vertical direction. As indicated, the proxy caches blocks 0, 4, and 8, i.e. it caches one of every four data blocks. At a next cache hit, the central server follows the original schedule to deliver the remaining blocks over the backbone network. The central server delivers nothing at time periods during which the proxy server has the data locally stored. In this regard, the peak bandwidth requirement of backbone connection has the same value as a cache miss. In other words, approach A does not reduce the peak bandwidth requirement of the central server, although it does reduce the average bandwidth requirement.

Approach B as illustrated in FIG. 3A reduces the peak data rate by stretching the delivery schedule specified in the approach A over the unused time slots. In other words, the central server divides the video data originally scheduled to be delivered over 3 regular time periods into 4 smaller blocks. One skilled in the art would understand how this may be accomplished so that it is not described herein. The central server also alters its delivery schedule so that the 4 smaller blocks are then delivered over 4 corresponding time periods (3 regular time periods plus the one otherwise unused time period in approach A). It reduces the peak data rate by 25%, down from r to 0.75r. Because data is delivered earlier than its scheduled time, however, the proxy server needs additional buffer space ((5/2)×r×p instead of 2×r×p in approach A) to cache the early arrived data and therefore the required of buffer space at the proxy is increased.

Approach C as illustrated in FIG. 3A marks the data block horizontally instead. At caching time, the proxy server keeps ¼ portion of every data block of a video title locally. This approach reduces the peak data rate of the backbone connection to 0.75r down from r. In the meantime, the buffer requirement remains at value of (2×r×p), as required by the original (uncached) schedule. A PVC scheme according to specific embodiments of the present invention adopts the approach C.

Generalized Proxy Video Server Models

As further illustration of specific embodiments of the invention, assume the total number of video blocks $n_i$ in video title $v_i$ is an integral multiple of N (i.e., $n_i$>N and $n_i$ mod N=0). For each jth block of $v_i$, which can be viewed as a set of N equal sized sub-blocks, denoted as $$v_i^{b_j^1}, v_i^{b_j^2}, \ldots v_i^{b_j^N}.$$

For each video cache hit or replacement, the next available sub-block of the data blocks of the accessed video clip is targeted. For instance, assume the PVC scheme with N=10, a video title $v_i$ with 100 blocks labeled in the time sequence in which they are to be sent as $v_i^1, v_i^2, \ldots, v_i^{100}$. These 100 blocks are to be sent sequentially to the client or user, and thus may be arranged as such. Assuming that the local proxy server does not have video title $v_i$ in its cache memory. Preferably the first request for video title $v_i$ will trigger the local proxy server to store data of $$v_i^{b_j^1}$$

(throughout where 1≦j≦100) into its local disk drives. This is illustrated in FIG. 3B. FIG. 3B is a schematic view of video title $v_i$ containing 100 blocks with each block divided into 10 sub-blocks to illustrate the preferred embodiment of the invention. As shown in FIG. 3B, when the video title $v_i$ is requested, the local proxy server will discover that it does not have this title in its cache memory and would, therefore, start storing a portion of the title in its cache memory. According to approach C described above, it is preferable to store a portion of each of the 100 blocks. In reference to FIG. 3B, the 100 sub-blocks $$v_i^{b_j^1},$$

with j ranging from 1 to 100, is then stored. This is shown in FIG. 3B schematically by the sub-blocks labelled i11, i12, . . . i1j . . . ,i110 above the dotted line 132, where the sub-blocks are collectively referred to as unit 132*a*. When the same title $v_i$ is requested again, the local proxy server may decide to increase the amount of title $v_i$ that is cached by storing another unit 134*a* of 100 sub-blocks $$v_i^{b_j^2}$$

with j ranging from 1 through 100 in its cache memory as indicated by the sub-blocks above the dotted line 134 in FIG. 3B. Yet another cache hit to the same video clip will add $v_i^{b_j^3}$ into the local disk drive provided that data $v_i^{b_j^1}$ and $v_i^{b_j^2}$ are still in the local server. This may then continue until all of the title vi is cached.

Thus if the local proxy server has enough resources and no cache replacement has happened, and the local proxy server decides to increase the sub-blocks of video title $v_i$ that are stored after each additional request for the title, then after 10 requests for video title $v_i$, the local server will have the whole content of $v_i$. The following equations defines the PVC caching effect described above in reference th FIG. 3B. With $C(v_i)$ indicating the current local cached content for video title $v_i$;

$$C(v_i) = \begin{cases} C(v_i) \cup \left\{ v_i^{b_j^k} \mid j=1,2,\ldots,n_i \right\} & v_i^{b_j^m} \in C(v_i) \text{ for } 1 \le m < k \\ \left\{ v_i^{b_j^1} \mid j=1,2,\ldots,n_i \right\} & C(v_i) = \emptyset \\ C(v_i) \end{cases}$$

where k is the current or most recent hit count.

The first sub-equation describes caching the data into the local proxy as long as the video title is not fully cached. The second sub-equation describes where there is no cache content at all for the accessed title. The third sub-equation describes the situation where the whole video title is cached in the local proxy already.

Similarly, according to further embodiments of the invention, whenever the local proxy server makes a decision to do PVC replacement on a video title, it removes the same amount of video data as the PVC caching does. The data portion or unit selected to be removed can be any one of the sets such as 132a, 134a, ... in FIG. 3B, each containing 100 sub-blocks that have been cached in the manner described above. Where the blocks are divided into sub-blocks according to a multilayered scalable approach described below, it is advantageous to remove the one set or unit that is most recently cached. The following equation illustrates this policy:

$$C(v_i) = \begin{cases} C(v_i) - \left\{ v_i^{b_j^k} \mid j=1,2,\ldots,n_i \right\} & v_i^{b_j^{k+1}} \notin C(v_i) \text{ for } 1 \le k < N \\ C(v_i) - \left\{ v_i^{b_j^N} \mid j=1,2,\ldots,n_i \right\} & v_i^{b_j^k} \in C(v_i) \text{ for } 1 \le k \le N \end{cases}$$

where k is the current or most recent hit count.

The above two equations describe that new cached content $C(v_i)$ for video title $v_i$ becomes the current $v_i$ minus the most recently cached portion.

Predetermined Caching Content

According to further embodiments of the invention, after installation of local proxy server, a further question is how to build up the local cache before the streaming service begins. Several possible approaches may be used according to the invention, such as no caching, average caching, or proportional caching based on access profile.

No caching, the simplest approach, leaves the local cache content empty initially and build up the local content while doing streaming service. This wastes the whole caching space at the beginning, which may be a major drawback, causing the requirement of higher backbone bandwidth at initial service period.

The average caching (or average bandwidth) approach utilizes all local proxy space by storing equal portions of video data from each video title. It is a good choice provided that there is no access history or the target application shows no preference among the video titles.

Proportional caching based on access profile caches data based on the video access history, with the expectation that past trends will continue.

After the cache system begins operation, as will be understood by those skilled in the art, the local cache content will change from time to time to reflect the actual video access behavior. This can be done using any algorithm, such as by increasing the number of sets of sub-blocks cached in proportion to the number of accesses within time periods, and removing them in proportion to the decrease in number of accesses when the number of accesses within time periods decrease. Unless there is a definite need to update the cache content (such as to manually cache a new video title release), the cache content using automatic updating is accurate enough.

Resource Constraints in Local Proxy

As discussed above, a local proxy server according to further embodiments of the invention, uses PVC to selectively cache data locally. To fulfill the cache operation, the local proxy server needs to supply sufficient resources, such as disk (or other mass memory) access bandwidth to write the selected data into local disks and to retrieve the cached data out from the local disks, and disk (or other mass memory) storage space to store the selected data.

Other local resources are the networking bandwidth (such as local interface to the backbone connection bandwidth between the remote central server and the local proxy server); and, the front end network connection of the local proxy server and the end user sites.

In practice, the local proxy server has limited resources with respect to memory buffer capacity, disk storage capacity and access bandwidth, and networking connection bandwidth. These resource constraints have important impacts on the caching performance. The caching process and its resource requirements according to further embodiments of the invention are discussed below.

According to further embodiments of the invention, the local proxy server begins the caching process after receiving a video playback request from an end user as follows:

Step 1: Make sure there is sufficient front end network bandwidth to deliver the new request. No matter whether the video data is ultimately delivered from the remote central server, the local proxy server, or both, the local proxy needs to deliver it to the user site. This demands sufficient front-end networking bandwidth, otherwise, the local proxy will deny the request.

Step 2: Deliver the video data to the user site. Depending on the new request and current cache content, there are three possible cases: cache hit, cache miss, and partial cache hit.

Case A: Cache hit. The proxy server has complete content of the newly requested video title. The local proxy server itself can deliver the video data provided that there is available local disk bandwidth retrieving the data out of the local disk drives.

Case B: Cache miss. The proxy server has nothing from the newly requested video title. The video data must come from the remote central server solely. Hence, there must be enough available backbone to carry the data from the central server to the local proxy. Otherwise, the proxy server should reject the request.

If there is enough backbone bandwidth, the proxy server can satisfy the new playback request. At this point, it is up to the proxy server to adjust its caching content to reflect the new request. The proxy server employing PVC, in turn, considers the current disk resource including disk access bandwidth (to have access bandwidth to write the selected video data into the disk drives) and disk storage capacity (to have space to store the selected video data). If both resources are available, the proxy server stores a portion of the newly requested video content. If the local proxy has enough local disk bandwidth but insufficient local disk space toward the selected data portion, it invokes cache replacement operation (see discussion below) to make room for it.

For the situation of not enough local disk bandwidth (whether there is available disk space), the caching will be called off. It means the proxy server will redirect the incoming data traffic (from the central server) to the end user without caching any data locally.

Case C: Partial cache hit. The proxy server has partial copy of the newly requested video title stored in its local disk drives. This situation is very similar to the cache miss scenario except some of the requested data will come from the proxy server. This implies the request will consume less backbone bandwidth resource (to deliver the data not in the local proxy), the access bandwidth of the local disk drives (to retrieve the local cached data out and to write the newly cached data that is not already cached from the central server into the local disks), and the disk space to store the newly cached data. Within the step, the request manager (see FIG. 6) in proxy server keeps track of accesses of and also refreshes the access profile for each requested video title. The caching replacement algorithm uses the up-to-date access profile as an important guideline for replacing the old cached data with the new content. Further details of the caching replacement algorithm are discussed below.

Caching Replacement

Caching replacement is replacing some existing video cache data with new content. To do caching replacement, it is necessary to decide which video title and what portion of the data will be replaced. As mentioned above, one can simply replace the most recently cached portion of a particular video.

To resolve the former concern (determining which video title to cache) is not as straightforward. The best case is to select the video title which has the best chance of being accessed in the future. Because predicting the future access pattern is difficult, the present invention in specific embodiments uses a heuristic approach to forecast the future access pattern. One approach is to use the most current access profile as an indication of the predicted future access profile. To do this, a proxy server according to the invention needs to keep track of each access request. As illustration, let $A_i(t)$ indicate a sequence of accesses to video $v_i$ from time 0 up to time t and is equal to $\{\alpha_i^{t_1}, \alpha_i^{t_2}, \ldots, \alpha_i^{t_{m_j}}\}$ where $\alpha_i^{t_j}$ indicates an access to video $v_i$ at time $t_j$. Therefore, $t_j \leq t_{j+1}$, for $1 \leq j \leq m$. In the case of $t_j = t_{j+1}$, it means two requests are happening at the same time.

One way to measure the access profile is called equally-weighted access frequency and is defined as follows:

$$AF_e(v_i, t) = \begin{cases} \dfrac{|\{a_i^{t_k} \mid t - W \leq t_k \leq t \text{ and } a_i^{t_k} \in A_i(t)\}|}{W} & \text{where } t \geq W \\[2mm] \dfrac{|\{a_i^{t_k} \mid 0 \leq t_k \leq t \text{ and } a_i^{t_k} \in A_i(t)\}|}{W} & \text{where } t < W \end{cases}$$

where $AF_e(v_i,t)$ is the equally-weighted access frequency of video title $v_i$ at time t. The access frequency is the number of requests to video title $v_i$ during time period of t−W and t. For the case of t<W, it measures access frequency in time period of 0 and $T_c$. The W denotes the value of time window. This is further illustrated in reference to FIG. 3C, which is a schematic view of an access profile. As shown in FIG. 3C, time t is the point in time to determine an access profile of a particular video title in order to decide whether such title should be cached or replaced, and a time window W is set measuring back from the time t. As shown in FIG. 3C, this is indicated as the time window between t−W (the beginning time for the window) and t (the end time for the window). The number of accesses for such video title is then added up, where accesses within the time window W are given equal weight. The sum of the number of accesses is then divided by the time window W to give the access frequency. FIG. 3C illustrates the case where the beginning time t−W of the window is after the beginning of time or time=0 and corresponds to the upper equation for the access frequency above. FIG. 3D illustrates the situation where the time window W is such that t−W is before the beginning of time or time=0 and corresponds to the second equation above for access frequency.

Another approach is to place different weights on accesses that occurred at various time instants. In this approach, accesses that happened recently are give more weight than accesses that happened earlier. A PVC scheme according to further embodiments of the invention based on this approach and the access frequency is called time-weighted access frequency and is defined as follows:

$$AF_t(v_i, t) = \begin{cases} \displaystyle\sum_{k=1}^{m_i} (a_i^{t_k} \times (t - t_k)) \text{ for } t - W \leq t_k \leq t & \text{where } t \geq W \\[2mm] \displaystyle\sum_{k=1}^{m_i} (a_i^{t_k} \times (t - t_k)) \text{ for } 0 \leq t_k \leq t & \text{where } t < W \end{cases}$$

How to decide the length of time window W is an interesting issue. A larger W value means collecting access pattern over longer period of time; thus accesses that happened earlier still carry some weight in choosing of the replacing video title. On the other hand, a smaller W value. An access happened at time long before now may also plays a role in replacement decision. A large time window has the advantage of less replacements. However, if the access pattern changes in the short period of time, it is not quickly enough to reflect the trend and adapt to it. On the other hand, a replacement policy with small time window value can adjust its cache content much close to the current access pattern. However, it may trigger excessive data replacement in a short period of time.

PVC Enhancement: C-PVC

The previous discussion was directed to embodiments of the invention directed to a single access to a video title. According to further embodiments of the invention, the invention is directed to multiple ongoing requests accessing different points of the same video title. This is particularly true for long video titles such as movies or for popular video titles. In this situation, according to further embodiments of the invention, the earlier ongoing request can be considered a prefetching of the later entered requests. In this embodiment, the present invention is therefore able to further reduce the backbone bandwidth requirement as discussed below. These further embodiments of the invention may be referred to herein as Compounded Progressive Video Caching (C-PVC).

FIG. 4 illustrates the compounded caching effect with N (discussed above) set to 4. Assume each request will trigger the caching operation. The FIG. 4(A) is the PVC and FIG. 4(B) is the C-PVC scheme. As shown, there are three requests accessing the same video title. When request 3 enters, the requests 2 and 1 are accessing the data of time $t_7$ and $t_{10}$ respectively. For the PVC scheme, the request 1 consumes backbone bandwidth of r. The request 2 needs backbone bandwidth of 0.75r because the proxy server has cached ¼ of data while serving the request 1. Similarly, the request 3 demands bandwidth of 0.5r since the proxy has cached 2/4 of data while serving the requests 2 and 3.

FIG. 4B shows the C-PVC scheme. The proxy server serves the request 1 by receiving the whole data from the central server and caching ¼ of the data from it. When the request 2 enters, the request 1 is at time $t_3$. The proxy server is still receiving from the central server for the request 1. By realizing there is a just entered request asking for the same video title, the proxy server can cache extra data in addition to its initially selected data. In our example, the request 2 only consumes 0.5r bandwidth after time $t_3$ comparing to 0.75r in the PVC scheme. When the request 3 entered at time $t_{10}$, the request 2 only needs 0.25r backbone bandwidth after time too. The newly entered request 3 consumes only 0.25r backbone bandwidth after time $t_7$.

In this example, if the whole video length is $t_{100}$. Then the total backbone bandwidth traffic for PVC scheme is equal to 225r (=100r+0.75r+0.5r for request 1, 2, and 3 respectively.) For C-PVC scheme, the total backbone bandwidth usage is equal to 155r.

Among three requests, they account for 100r, (3×0.75xr+ 7×0.5xr+90×0.25xr), and (7×0.5xr+93×0.25xr), for request 1, 2, and 3 respectively. In compared to PVC scheme, the C-PVC scheme in this example saves backbone bandwidth of 31.11%.

Scalable Multilayered Approach

According to International Standard ISO/IEC 13818-2, first edition, May 15, 1996, which is incorporated herein by reference, several types of scalable video coding are proposed. This standard proposes three types of scalability: SNR scalability, spatial scalability and temporal scalability. In each of the three types of scalabilities, it is envisioned that a base layer would provide basic video data adequate for reproducing a video image. Thus, for viewers with limited bandwidth, all that is transmitted is the basic layer. For viewers with higher bandwidth capability, each of the three types of scalabilities has in addition one or more enhancement layers, which, when combined with the basic layer information, enhance the video quality seen by the viewer. Thus in SNR scalability, all layers have the same spatial resolution. The base layer provides the basic video quality. The enhancement layer increases the video quality by providing refinement data for the DCT coefficients of the base layer. In spatial scalability, the base layer provides the basic spatial resolution and temporal rate. The enhancement layer uses the spatially interpolated base layer to increase the spatial resolution. In temporal scalability, a base layer provides the basic temporal rate. The enhancement layer uses temporal prediction relative to the base layer. The base and enhancement layers can be combined to produce a full temporal rate output. MPEG 2 supports the above-described scalability approach. Reference to the MPEG 2 approach to scalability is made to Chapter 11 entitled "MPEG 2" of *Video Demystified, A Handbook for the Digital Engineer*, Second Edition, HighText Interactive, Inc., San Diego, Calif., 1996, pp. 503–512. Such Chapter is incorporated here in its entirety by reference.

In addition to the above-described scalability approach, other types of scalable embodiments are possible.

In reference to spatial scalable coding, for example, in consumer electronics most video sources use an interlaced display format: each frame is scanned out as two (odd and even) fields that are separated temporally and offset spatially in the vertical direction. Thus, in one form of spatial scalable coding, the lower layer may comprise one of the two fields of an interlaced display format and the enhancement layer may comprise the other field. Thus, when there is inadequate bandwidth for transmitting both fields from the proxy server to the client or clients, only the basic layer comprising one of the fields is sent, where the only one field sent will provide a somewhat degraded but adequate video image. If the bandwidth from the proxy server to the client is adequate, however, the enhancement layer comprising the other field is sent as well so that the two fields together will provide a better quality video image to the client. In other words, the basic layer in the spatial scalable coding approach would comprise the video data along one set of scan lines (e.g. odd numbered scan lines) according to any one of the commonly used standards such as NTSC, and the enhancement layer would comprise video data along the other set of scan lines (e.g. even numbered scan lines) comprising the other field according to the same standard. When the link between the proxy server and the client has limited bandwidth so that only the basic layer can be transmitted, the information in the only one field of the basic layer can be converted into a full video frame by any one of many well known algorithms such as scan line interpolation and field merging as described, for example, in Chapter 9 entitled "Video Processing" of *Video Mystified, A Handbook for the Digital Engineer*, Second Edition, High Text Interactive, Inc., San Diego, Calif., 1996, pp. 386–394; such Chapter is incorporated here in its entirety by reference. While the example above envisions dividing the video information into two equal parts for partitioning into the two layers, it is possible to partition them into unequal parts, such as one quarter for the basic layer and three-quarters for the enhancement layer, and possible to further divide the three-quarters into more than one enhancement layers, where the number of enhancement layers sent can be determined as a function of available bandwidth.

Another example of a temporal scalable approach may be as follow. Where a video source provides video data at a particular sampling rate. Some of the video data samples from the source are grouped together to comprise the basic layer transmitted at a sampling rate that is lower than that of the source, and the remaining samples grouped together also and transmitted at a lower sampling rate will comprise the enhancement layer. As in the situation of the spatial scalable approach described above, where the bandwidth does not permit transmission of both the basic layer and the enhancement layer, only the basic layer will be transmitted and known techniques may be employed to convert the video data at the lower sampling rate to a full video frame. Where the bandwidth permits transmission of both the basic and enhancement layers, the samples from both layers will be combined in a known manner to present a better quality video. Again, the division of the samples from the source into the two layers can be done so that the two layers do not have the same number of samples, and it is further possible to divide the samples into a basic layer and more than one enhancement layer.

The above-described schemes may be used for implementing the approach C in FIG. 3A. Thus, in the case of the spatial scalable approach described above, the video data along ¼ of the scan lines of the video frame may be cached where such scan lines are preferably evenly spaced across the frame, so that only the video data along the remaining ¾ of the scan lines of the video frame would need to be fetched from the central server. Similarly, in a temporal scalable approach, ¼ of the video samples also preferably evenly spaced temporally across the video frame may be cached while the remaining samples may be fetched from the central server to implement approach C in FIG. 3A.

Structural Examples of Proxy Server and Cache Memory

To better understand the invention, FIG. 6 shows a block diagram of a proxy server corresponding to proxy server 108 or 110 in FIG. 5 to illustrate an exemplary configuration of a communication system in which the present invention may be practiced.

According to one embodiment of the present invention, the proxy server is loaded with a compiled and linked version of an embodiment of the present invention, when executed by the process, the compiled and link version may perform the following method:

determining the number of requests to a video title;
storing in a cache of a proxy server, in response to the number of the requests for the video title, a corresponding plurality of cache units of the video title;
updating the cache every time a new request is received; wherein the updating comprises:
storing in the cache more cache units of the video title if the new request corresponds to the video title; and T
deleting from the cache at least one or more cache units of the video title if the new request does not correspond to the video title, or not deleting any cache units if there is enough storage space for caching new cache units or other reasons.

FIG. 7 shows an exemplary layout of a cache memory at the proxy server. It is assumed each video is equally divided into N cache units. As described above, each cache unit may comprise different sub-blocks from different blocks, such as unit 132a, 134a. Depending on the access frequency, the number of the cache units of each video varies. In other words, the higher the number of the requests to a video title, the more the number of the cache units of the video are cached in the cache memory in the proxy server. When there are no more requests to the video title, the cache memory are updated, namely the number of the cache units of the video is reduced or totally deleted, leaving room for other video titles. The progressive video caching technique result in a scalable caching mechanism and improve significantly the overall performance of the medial delivery system.

FIG. 8 shows the block diagram of the central video server corresponding to server 102 of FIG. 1. The load manager receives requests from a proxy server and ensures a requested video is delivered in a most efficient way. The content manager provides typically a background to the terminal device to display the video. The background may include additional information that the service provider prefers the user of the terminal device to attend, such as service/product promotion information.

FIG. 9 shows an embodiment of the central video server according to the present invention.

To further understand the present invention, FIG. 10 and FIG. 11 show, respectively and according to one embodiment of the present invention, a process flowchart of the proxy module and the video server module each executed in the proxy server and the central video server.

The media delivery system as described herein in accordance with one aspect of the present invention is robust, operationally efficient and cost-effective. The progressive caching mechanism provides the best use of the cache memory in proxy servers and permits seamless delivery of streaming video with guaranteed quality of services. In addition, the present invention may be used in connection with presentations of any type, including sales presentations and product/service promotion, which provides the video service providers additional revenue resources.

The processes, sequences or steps and features discussed herein are related to each other and each are believed independently novel in the art. The disclosed processes and sequences may be performed alone or in any combination to provide a novel and nonobvious file structure system suitable for media delivery system. It should be understood that the processes and sequences in combination yield an equally independently novel combination as well, even if combined in their broadest sense.

Other Embodiments

The invention has now been described with reference to specific embodiments. Other embodiments will be apparent to those of skill in the art. In particular, a user digital information appliance has generally been illustrated as a personal computer. However, the digital computing device is meant to be any device for interacting with a remote data application, and could include such devices as a digitally enabled television, cell phone, personal digital assistant, etc.

Furthermore, while the invention has in some instances been described in terms of client/server application environments, this is not intended to limit the invention to only those logic environments described as client/server. As used herein, "client" is intended to be understood broadly to comprise any logic used to access data from a remote system and "server" is intended to be understood broadly to comprise any logic used to provide data to a remote system.

It is understood that the examples and embodiments described herein are for illustrative purposes only and that various modifications or changes in light thereof will be suggested by the teachings herein to persons skilled in the art and are to be included within the spirit and purview of this application and scope of the claims and their equivalents.

Embodiment in a Programmed Information Appliance

As shown in FIG. 12, the invention can be implemented in hardware and/or software. In some embodiments of the invention, different aspects of the invention can be implemented in either client-side logic or a server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media program may be delivered to a user on a fixed media for loading in a users computer or a fixed media program can reside on a remote server that a user accesses through a communication medium in order to download a program component.

FIG. 12 shows an information appliance (or digital device) 700 that may be understood as a logical apparatus that can read instructions from media 717 and/or network port 719. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717 may be used to program such a system and may represent a disk-type optical or magnetic media, magnetic tape, solid state memory, etc. The invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language which may be used to create an ASIC or PLD that operates as herein described.

What is claimed is:

1. A method of caching in a system for transmitting a plurality of media data titles to one or more client(s) from a central server computer system and a proxy server computer system located in a computer network, said proxy server computer system located in the network between the central server computer system and the one or more client(s), wherein each media data title is divided into blocks to be transmitted to the one or more client(s) in a time sequence, and each block is divided into sub-blocks, comprising:

causing the central server computer system to transmit data in the media data titles to the proxy server computer system via a backbone network connection, and the proxy server computer system to transmit data in the media data titles to one or more client(s) via a local network connection;

identifying which sub-blocks from different blocks of each media data title that are to be cached, wherein the identified sub-blocks include some sub-blocks in each of the blocks of at least one media data title;

caching only the identified sub-blocks at the proxy server computer system to reduce the transmission bit rate of the central server computer system in the network for transmitting data in the media data titles to the proxy server computer system; and combining sub-blocks of a media data title cached at the proxy server computer system with sub-blocks of the media data title not cached at the proxy server computer system and transmitted from the central server computer system to the proxy server computer system through the network, for delivery to the one or more client(s), wherein a peak transmission rate in the backbone network connection for the central server computer system to transmit data in the media data titles to the proxy server computer system is reduced;

wherein the media data titles include video titles and the sub-blocks comprise partial information of video frames, wherein the video frames are to be transmitted sequentially wherein the combining combines the partial information of video frames from the proxy server computer system with complementary partial information of such video frames from the central server computer system into complete video frames and sending the complete video frames to the client(s); and wherein the partial information comprise video information obtained at a set of sampling times and at a first sampling rate lower than that of a video source from which said information originates, and wherein the combining combines the video information at the lower first sampling rate from the proxy server computer system with complementary video information taken at sampling times different from the set of sampling times of such video frames from the central server computer system into video data at a sampling rate higher than the first sampling rate and sending the video data at the higher sampling rate to the client(s).

2. The method of claim 1, wherein the cached sub-blocks are cached for time periods that are independent of time.

3. The method of claim 1, wherein the caching caches substantially the same number of sub-blocks from each block of said at least one media data title.

4. The method of claim 1, wherein the partial information comprise video information along some scan lines of video frames, further comprising combining the video information along such scan lines with complementary video information along other scan lines of such video frames from the central server computer system into complete video frames and sending the complete video frames to the client(s).

5. The method of claim 1, wherein the partial information comprise video information in a basic layer and the complementary partial information comprises video information in an enhancement layer, said basic and enhancement layers being defined according to spatial, signal-to-noise or temporal scalability.

6. The method of claim 1, wherein the identifying is made as a function of an access profile of the media data titles at the proxy.

7. The method of claim 1, wherein prior to any accesses of the media data titles by the client(s), an average caching approach utilizes storage at the proxy server computer system by storing a substantially equal number of sub-blocks from each media data title.

8. The method of claim 1, wherein prior to any accesses of the media data titles by the client(s), a proportional caching approach utilizes access history data to determine how much of each media data title to cache.

9. The method of claim 1, wherein after the system starts operation, cache content at the proxy server computer system will change from time to time to reflect actual access behavior.

10. The method of claim 1, further comprising beginning a caching process at the proxy server computer system after receiving a media data-title request from a client by ensuring there is sufficient bandwidth from said proxy to such client to deliver the request and if not, denying the request.

11. The method of claim 10, further comprising delivering the complete content of the requested media data title when such content is in local storage of said proxy server computer system.

12. The method of claim 10, further comprising:
when said proxy server computer system does not have complete content of the requested media data title, determining if there is sufficient available backbone bandwidth to carry said media data title from the central server computer system to said proxy server computer system and if not, rejecting the request.

13. The method of claim 12, further comprising activating a progressive caching process to adjust cache content at said proxy server computer system to reflect the requested media data title.

14. The method of claim 1, further comprising replacing a cached portion of a particular media data title by deleting the most recently cached portion of such media data title.

15. The method of claim 1, further comprising deciding which media data titles shall be subject to caching replacement using a most current access profile as an indication of a future profile.

16. The method of claim 1, further comprising keeping track of each access request at the proxy server computer system in order to determine which media data titles shall be subject to caching replacement.

17. The method of claim 1, further comprising deciding which media data titles shall be subject to caching replacement using a current access profile as an indication of the future profile, wherein said deciding includes:
defining a time window ending at the time of the caching replacement;
calculating an access frequency of each media data title in a storage of the proxy server computer system said access frequency being a function of the accesses to such media data title during the time window or a portion thereof; and
performing the caching replacement in response to the access frequencies of the media data titles in the storage.

18. The method of claim 17, wherein said access frequency is proportional to the sum of the accesses to such media data title during the time window or a portion thereof.

19. The method of claim 17, wherein said access frequency is proportional to a time-weighted sum of the accesses to such media data title during the time window or a portion thereof, with the time weighting in favor of accesses occurring more recently in the window.

20. The method of claim 1, further comprising detecting multiple ongoing requests from clients for a media data title received at different times during caching in response to an initial request of said media data title, and increasing the number of sub-blocks cached from the blocks of at least one media data title in response to a subsequent request of said media data title.

21. A system for delivering media information; the system comprising:
a plurality of proxy server computer systems, each servicing a number of terminal devices via a local network connection and receiving a request from one of said terminal devices when a user of said one of said terminal devices desires for a media data title among a plurality of media data titles, said media data titles divided into units that are transmitted in a time sequence to one or more of the terminal devices; each of said proxy server computer systems comprising a cache memory for storing information in units of at least some of the media data titles; wherein amount of information in the units of each of said at least some media data titles stored or replaced in the cache memory is determined by a request frequency to said each of said media data titles; and
a central server computer system coupled to said proxy server computer systems via a backbone connection in a network, said proxy server computer systems located in the network between the central server computer system and one or more client(s), wherein the central server computer system transmits data in the media data titles to the proxy server computer systems, and each of the proxy server computer systems transmits data in the media data titles to one or more terminal devices;
said central server computer system having a storage space for storing a plurality of said media data titles and providing data from one or more of said media data titles when receiving a proxy request from one of said proxy server computer systems, wherein the units of at least one of said media data titles containing information cached in the cache memory of said one proxy server computer system are divided into sub-blocks, and wherein the sub-blocks stored in the cache memory of said one proxy server computer system include some sub-blocks in each of the units of said at least one media data title;
said one proxy server computer system combining the sub-blocks in cached units with uncached sub-blocks in units received through the network from the central server computer system to form a data stream of complete media data title(s) and transmitting the combined sub-blocks in units of such media data title(s) to one or more terminal devices, so that the transmission bit rate of the central media server computer system in the backbone connection of the network for transmitting data from the at least some media data titles to said one of the proxy server computer systems is reduced,
wherein the media data titles include video titles, and the sub-blocks comprise partial information of video frames, wherein the video frames are to be transmitted sequentially wherein said one proxy server computer system combines the partial information of video frames from the proxy server computer system with complementary partial information of such video frames from the central server computer system into complete video frames and sending the complete video frames to the clients):
wherein the partial information comprise video information obtained at a set of sampling times and at a first sampling rate lower than that of a video source from which said information originates, and wherein said one proxy server computer system combines the video information at the lower first sampling rate from the proxy server computer system with complementary video information taken at sampling times different from the set of sampling times of such video frames from the central server computer system into video data at a sampling rate higher than the first sampling rate and sending the video data at the higher sampling rate to the client(s).

22. A system for delivering media information; the system comprising:
a plurality of proxy server computer systems, each servicing a number of terminal devices and receiving a request from one of said terminal devices when a user of said one of said terminal devices desires a media data title from a plurality of media data titles; wherein at least one of said proxy server computer systems comprises a cache memory; and a central server computer system coupled to said proxy server computer systems in a network, said proxy server computer systems located in the network between the central server computer system and one or more client(s), wherein the central server computer system transmits data in the media data titles to the proxy server computer systems, and the proxy server computer systems transmit data in the media data titles to one or more client(s); said central server computer system having a storage space for storing a plurality of said media data titles and providing data from one of said media data titles when receiving a proxy request from said at least one of said proxy server computer systems, said cache memory of said at least one proxy server computer system caching only some of the units of said at least one media data title, said at least one proxy server computer system combining the cached units with uncached units received through the network from the central server computer system to form a data stream of a complete media data title and transmitting such media data title to one or more client(s), so that the transmission bit rate of the central server computer system in the network for transmitting the at least one media data title to said at least one proxy server computer system is reduced, wherein said at least one of said You media data titles includes video frames to be transmitted in a time sequence, each frame being divided into sub-blocks, each of the sub-blocks comprising partial information of a video frame, wherein said units of said at least one media data title cached at said proxy server computer system comprise partial information of substantially all of the video frames in said at least one eel media data title so that said one proxy server computer system combines the cached partial information of substantially all of the video frames in said at least one media data title with complementary partial information of such video frames from the central server computer system into complete video frames and sends the complete video frames to terminal devices;

wherein the partial information comprise video information obtained at a set of sampling times and at a first sampling rate lower than that of a video source from which said information originates, and wherein said one proxy server computer system combines the video information at the lower first sampling rate from said one proxy server computer system with complementary video information taken at sampling times different from the set of sampling times of such video frames from the central server computer system into video data at a sampling rate higher than the first sampling rate and sending the video data at the higher sampling rate to terminal devices.

23. The system of claim 22, wherein said at least one proxy server computer system stores the units of the at least one media data title for time periods that are independent of time.

24. The system of claim 22, wherein the at least one media data title is divided into blocks to be transmitted to the one or more user(s) in a time sequence, and each block is divided into sub-blocks, wherein the at least one proxy server computer system caches the same number of sub-blocks from each block of said at least one media data title.

25. The system of claim 22, wherein the partial information comprise video information along some scan lines of video frames, and wherein the at least one proxy server computer system combines the video information along such scan lines with complementary video information along other scan lines of such video frames from the central server computer system into complete video frames and sends the complete video frames to the user(s).

26. The system of claim 22, wherein the sub-blocks comprise information in a base layer of a scalable multilayer system.

27. The system of claim 22, where the number of units is a function of an access profile of the at least one media data title at the at least one proxy server computer system.

28. A method of caching in a system for transmitting a plurality of media data titles to one or more client(s) from a central server computer system and a proxy server computer system in a network, said proxy server computer system located in the network between the central server computer system and the one or more client(s), wherein each media data title is divided into blocks to be transmitted to the one or more client(s) in a time sequence, and each block is divided into sub-blocks, comprising:

identifying which sub-blocks from different blocks of each media data title that are to be cached, wherein the identified sub-blocks include sub-blocks that are distributed over the blocks of at least one media data title;

caching only the identified sub-blocks at the proxy server computer system to reduce the transmission bit rate of the central server computer system in the network for transmitting data in the media data titles to the proxy server computer system; and combining sub-blocks of a media data title cached at the proxy server computer system with sub-blocks of the media data title not cached at the proxy server computer system and transmitted from the central server computer system through the network to the proxy server computer system, for delivery to the one or more client(s), wherein the cached sub-blocks of at least one of said media data titles comprise partial information of video frames, wherein the video frames are to be transmitted sequentially, and wherein said one proxy server computer system combines the cached partial information of video frames with complementary partial information of such video frames from the central server computer system into complete video frames and sends the complete video frames to the one or more client(s);

wherein the partial information comprise video information obtained at a set of sampling times and at a first sampling rate lower than that of a video source from which said information originates, and wherein said combining combines the video information at the lower first sampling rate from the proxy server computer system with complementary video information taken at sampling times different from the set of sampling times of such video frames from the central server computer system into video data at a sampling rate higher than the first sampling rate and sending the video data at the higher sampling rate to the client(s).

29. The method of claim 28, wherein the cached sub-blocks are stored for time periods that are independent of time.

30. The method of claim 28, wherein the caching caches the same number of sub-blocks from each block of said at least one media data title.

31. A computer readable storage device embodying a program of instructions executable by a computer to perform a method of caching in a system for transmitting a plurality of media data titles to one or more client(s) from a central server computer system and a proxy server computer system in a network, said proxy server computer system located in the network between the central server computer system and the one or more client(s), wherein each media data title is divided into blocks to be transmitted to the one or more client(s) in a time sequence, and each block is divided into sub-blocks, said method comprising:
 identifying which sub-blocks from different blocks of each media data title that are to be cached, wherein the identified sub-blocks include sub-blocks that are distributed over the blocks of at least one media data title;
 caching the identified sub-blocks under the control of the proxy server computer system to reduce the transmission bit rate of the central server computer system in the network for transmitting data in the media data titles to the proxy server computer system; and
 combining sub-blocks of a media data title cached at the proxy server computer system with sub-blocks of the media data title not cached at the proxy server computer system and transmitted from the central server computer system through the network to the proxy server computer system, wherein the cached sub-blocks of at least one of said media data titles comprise partial information of video frames, wherein the video frames are transmitted sequentially to the one or more client(s), and wherein said one proxy server computer system combines the cached partial information of video frames with complementary partial information of such video frames from the central server computer system into complete video frames and sends the complete video frames to the one or more client(s);
 wherein the partial information comprise video information obtained at a set of sampling times and at a first sampling rate lower than that of a video source from which said information originates, and wherein said combining combines the video information at the lower first sampling rate from the proxy server computer system with complementary video information taken at sampling times different from the set of sampling times of such video frames from the central server computer system into video data at a sampling rate higher than the first sampling rate and sending the video data at the higher sampling rate to the client(s).

32. The device of claim 31, wherein the cached sub-blocks are stored for time periods that are independent of time.

33. The device of claim 31, wherein the caching caches substantially the same number of sub-blocks from each block of said at least one media data title.

34. The device of claim 31, wherein the partial information comprise video information along some scan lines of video frames, said method further comprising combining the video information along such scan lines with complementary video information along other scan lines of such video frames from the central server computer system into complete video frames and sending the complete video frames to the client(s).

35. The device of claim 31, wherein the partial information comprise video information in a basic layer and the complementary partial information comprises video information in an enhancement layer, said basic and enhancement layers being defined according to spatial, signal-to-noise or temporal scalability.

36. The device of claim 31, wherein the identifying is made as a function of an access profile of the media data titles at the proxy server computer system.

37. The device of claim 31, wherein prior to any accesses of the media data titles by the client(s), an average caching approach utilizes storage at the proxy server computer system by storing a substantially equal number of sub-blocks from each media data title.

38. The device of claim 31, wherein prior to any accesses of the media data titles by the client(s), a proportional caching approach utilizes access history data to determine how much of each media data title to cache.

39. The device of claim 31, wherein after the system starts operation, cache content at the proxy server computer system will change from time to time to reflect actual access behavior.

40. The device of claim 31, said method further comprising beginning a caching process at the proxy server computer system after receiving a media data title request from a client by ensuring there is sufficient bandwidth from said proxy server computer system to such client to deliver the request and if not, denying the request.

41. The device of claim 40, said method further comprising delivering the complete content of the requested media data title when such content is in local storage of said proxy server computer system.

42. The device of claim 40, said method further comprising:
 when said proxy server computer system does not have complete content of the requested media data title, determining if there is sufficient available backbone bandwidth to carry said media data title from the central server computer system to said proxy server computer system and if not, rejecting the request.

43. The device of claim 42, said method further comprising activating a progressive caching process to adjust cache content at said proxy server computer system to reflect the requested media data title.

44. The device of claim 31, said method further comprising replacing a cached portion of a particular media data title by deleting the most recently cached portion of such media data title.

45. The device of claim 31, said method further comprising deciding which media data titles shall be subject to caching replacement using a most current access profile as an indication of a future profile.

46. The device of claim 31, said method further comprising keeping track of each access request at the proxy server computer system in order to determine which media data titles shall be subject to caching replacement.

47. The device of claim 31, said method further comprising deciding which media data titles shall be subject to caching replacement using a current access profile as an indication of the future profile, wherein said deciding includes:
 defining a time window ending at the time of the caching replacement;
 calculating an access frequency of each media data title in a storage of the proxy server computer system, said access frequency being a function of the accesses to such media data title during the time window or a portion thereof; and performing the caching replacement in response to the access frequencies of the media data titles in the storage.

48. The device of claim 47, wherein said access frequency is proportional to the sum of the accesses to such media data title during the time window or a portion thereof.

49. The device of claim 47, wherein said access frequency is proportional to a time-weighted sum of the accesses to such media data title during the time window or a portion thereof, with the time weighting in favor of accesses occurring more recently in the window.

50. The device of claim 31, said method further comprising detecting multiple ongoing requests from clients for a media data title received at different times during caching in response to an initial request of said media data title, and increasing the number of sub-blocks cached from the blocks of at least one media data title in response to a subsequent request of said media data title.

51. A method for transmitting a program of instructions executable by a computer to perform a process of caching in a system for transmitting a plurality of media data titles to one or more client(s) from a central server computer system and a proxy server computer system in a network, said proxy server computer system located in the network between the central server computer system and the one or more client (s), wherein each media data title is divided into blocks to be transmitted to the one or more client(s) in a time sequence, and each block is divided into sub-blocks, said method comprising:

transmitting to a client device a program of instructions; and enabling the client device to perform, by means of such program, the following process:

identifying which sub-blocks from different blocks of each media data title that are to be cached, wherein the identified sub-blocks include sub-blocks that are distributed over the blocks of at least one media data title; and caching the identified sub-blocks under the control of the proxy server computer system to reduce the transmission bit rate of the central server computer system in the network for transmitting data in the media data titles to the proxy server computer system; and combining sub-blocks of a media data title cached at the proxy server computer system with sub-blocks of the media data title not cached at the proxy server computer system and transmitted from the central server computer system through the network to the proxy server computer system, for delivery to the one or more client(s), wherein at least one of said media data titles cached includes a media data title divided into blocks to be transmitted in a time sequence, and each block is divided into sub-blocks some of which are cached, and the cached sub-blocks comprise partial information of video frames, wherein the video frames are to be transmitted sequentially, and wherein said proxy server computer system combines the partial information of video frames with complementary partial information of such video frames from the central server computer system into complete video frames and sends the complete video frames to client(s);

wherein the partial information comprise video information obtained at a set of sampling times and at a first sampling rate lower tan that of a video source from which said information originates, and wherein said combining, combines the video information at the lower first sampling rate from the proxy server computer system with complementary video information taken at sampling times different from the set of sampling times of such video frames from the central server computer system into video data at a sampling rate higher than the first sampling rate and sending the video data at the higher sampling rate to the client(s).

52. The method of claim 51, wherein the program enables the cached sub-blocks to be stored for time periods that are independent of time.

53. The method of claim 51, wherein the program enables the caching to cache substantially the same number of sub-blocks from each block of said at least one media data title.

54. The method of claim 51, wherein the partial information comprise video information in a basic layer and the complementary partial information comprises video information in an enhancement layer, said basic and enhancement layers being defined according to spatial, signal-to-noise or temporal scalability.

55. The method of claim 51, wherein the identifying is made as a function of an access profile of the media data titles at the proxy.

56. The system of claim 22, wherein the central server computer system transmits data in the media data titles to the at least one proxy server computer system via a backbone network connection, and the at least one proxy server computer system transmits data in the media data titles to one or more client(s) via a local network connection, and wherein a peak transmission rate in the backbone network connection for the central server computer system to transmit data from the at least some media data titles to the at least one proxy server computer system is reduced.

57. The method of claim 28, further comprising causing the central server computer system to transmit data in the media data titles to the proxy server computer system via a backbone network connection, and the proxy server computer system to transmit data in the media data titles to one or more client(s) via a local network connection; wherein a peak transmission rate in the backbone network connection for the central server computer system to transmit data in the media data titles to the proxy server computer system is reduced.

58. The device of claim 31, said method further comprising causing the central server computer system to transmit data in the media data titles to the proxy server computer system via a backbone network connection, and the proxy server computer system to transmit data in the media data titles to one or more client(s) via a local network connection; wherein a peak transmission rate in the backbone network connection for the central server computer system to transmit data in the media data titles the proxy server computer system is reduced.

59. The method of claim 51, further comprising causing the central server computer system to transmit data in the media data titles to the proxy server computer system via a backbone network connection, and the proxy server computer system to transmit data in the media data titles to one or more client(s) via a local network connection;

wherein a peak transmission rate in the backbone network connection for the central server computer system to transmit data in the media data titles to the proxy server computer system is reduced.

60. The method of claim 28, said sub-blocks of said at least one media data title cached at said proxy server computer system comprise partial information of substantially all of the video frames in said at least one media data title.

61. The device of claim 31, said sub-blocks of said at least one media data title cached at said proxy server computer system comprise partial information of substantially all of the video frames in said at least one media data title.

62. The method of claim 51, said sub-blocks of said at least one media data title cached at said proxy server computer system comprise partial information of substantially, all of the video frames in said at least one media data title.

63. A method of caching in a system for transmitting a plurality of media data titles to one or more client(s) from a central server computer system and a proxy server computer system located in a computer network, said proxy server computer system located in the network between the central server computer system and the one or more client(s), wherein each media data title is divided into blocks each divided into sub-blocks comprising partial information of video frames, wherein the video frames are to be sequentially transmitted to the one or more client(s), comprising:

causing the central server computer system to transmit data in the media data titles to the proxy server computer system via a backbone network connection, and the proxy server computer system to transmit data in the media data titles to one or more client(s) via a local network connection;

identifying which sub-blocks from different blocks of each media data title that are to be cached, wherein the identified sub-blocks include some sub-blocks in each of the blocks of at least one media data title;

caching only the identified sub-blocks at the proxy server computer system to reduce the transmission bit rate of the central server computer system in the backbone network connection for transmitting data in the at least one media data title to the proxy server computer system; and transmitting sub-blocks of the media data titles cached at the proxy server computer system to the one or more client(s);

wherein the cached sub-blocks comprise partial video frames obtained at a set of sampling times and at a first sampling rate lower than that of a video source from which said information originates, said method further comprising combining the cached sub-blocks at the lower first sampling rate from the proxy server computer system with complementary uncached sub-blocks of such video frames taken at sampling times different from the set of sampling times of such video frames from the central server computer system into video data at a sampling rate higher than the first sampling rate and sending the video data at the higher sampling rate to the client(s).

64. The method of claim 63, wherein said blocks comprise video frames, and the sub-blocks comprise video information along some scan lines of the video frames so that the transmitting transmits some scan lines of the video frames.

65. The method of claim 63, wherein said transmitting transmits some scan lines that are evenly spaced across the video frames.

66. The method of claim 63, said sub-blocks of said at least one media data title cached at said proxy server computer system comprise partial information of substantially all of the video frames in said at least one media data title.

\* \* \* \* \*